(12) United States Patent
Ekman

(10) Patent No.: US 11,164,256 B2
(45) Date of Patent: Nov. 2, 2021

(54) PRICE ESTIMATION MODEL

(71) Applicant: Eagle View Technologies, Inc., Bothell, WA (US)

(72) Inventor: Dean Ekman, River Falls, WI (US)

(73) Assignee: Eagle View Technologies, Inc., Bellevue, WA (US)

( * ) Notice: Subject to any disclaimer, the term of this patent is extended or adjusted under 35 U.S.C. 154(b) by 0 days.

(21) Appl. No.: 14/272,172

(22) Filed: May 7, 2014

(65) Prior Publication Data

US 2014/0278809 A1 Sep. 18, 2014

Related U.S. Application Data

(62) Division of application No. 13/843,437, filed on Mar. 15, 2013.

(51) Int. Cl.
*G06Q 40/08* (2012.01)
*G06Q 30/02* (2012.01)

(52) U.S. Cl.
CPC ......... *G06Q 40/08* (2013.01); *G06Q 30/0205* (2013.01); *G06Q 30/0206* (2013.01)

(58) Field of Classification Search
CPC .................................................. G06Q 10/087
USPC ...................................................... 705/7.35
See application file for complete search history.

(56) References Cited

U.S. PATENT DOCUMENTS 2,791,151 A 5/1957 Pennington
3,617,016 A 11/1971 Bolsey
5,247,356 A 9/1993 Ciampa
5,379,105 A 1/1995 Iki et al.
5,596,494 A 1/1997 Kuo
5,633,946 A 5/1997 Lachinski et al.
5,633,995 A 5/1997 McClain
5,983,010 A 11/1999 Murdock et al.
6,323,885 B1 11/2001 Wiese
6,333,749 B1 12/2001 Reinhardt et al.
6,385,541 B1 5/2002 Blumberg et al.
6,396,491 B2 5/2002 Watanabe et al.
6,446,053 B1 9/2002 Elliott
6,496,184 B1 12/2002 Freeman et al.
6,636,803 B1 10/2003 Hartz, Jr. et al.
6,760,117 B2 7/2004 Slatter (Continued)

FOREIGN PATENT DOCUMENTS

AU  2008230031 B8  11/2009
CA  2191954 A1  12/1995

(Continued)

OTHER PUBLICATIONS

"3D Reconstruction," retrieved Oct. 25, 2013, from http://www8cs.umu.se/kurser/TDBD19/V705/reconstruct-4.pdf, 5 pages.

(Continued)

*Primary Examiner* — Cho Kwong
(74) *Attorney, Agent, or Firm* — Dunlap Codding, P.C.

(57) ABSTRACT

The present disclosure proposes systems and methods to create an integrated centralized database that aggregates repair material and labor cost data by geographic area in real time and provides a repair cost estimating platform based on data collected from various data sources including directly from roofing contractors who have recently performed repairs.

19 Claims, 19 Drawing Sheets

(56) References Cited

U.S. PATENT DOCUMENTS

| | | | |
|---|---|---|---|
| 6,836,270 B2 | 12/2004 | Du | |
| 6,980,690 B1 | 12/2005 | Taylor et al. | |
| 7,003,400 B2 | 2/2006 | Bryant | |
| 7,006,977 B1 | 2/2006 | Attra et al. | |
| 7,133,551 B2 | 11/2006 | Chen et al. | |
| 7,233,691 B2 | 6/2007 | Setterholm | |
| 7,305,983 B1 | 12/2007 | Meder et al. | |
| 7,324,666 B2 | 1/2008 | Zoken et al. | |
| 7,327,880 B2 | 2/2008 | Tek | |
| 7,333,963 B2 | 2/2008 | Widrow et al. | |
| 7,343,268 B2 | 3/2008 | Kishikawa | |
| 7,373,303 B2 | 5/2008 | Moore et al. | |
| 7,376,284 B2 | 5/2008 | Tao et al. | |
| 7,424,133 B2 | 9/2008 | Schultz et al. | |
| 7,460,214 B2 | 12/2008 | Schiavi | |
| 7,487,114 B2 | 2/2009 | Florance et al. | |
| 7,500,391 B2 | 3/2009 | Woro | |
| 7,509,241 B2 | 3/2009 | Guo et al. | |
| 7,519,206 B2 | 4/2009 | Mulet-Parada et al. | |
| 7,583,275 B2 | 9/2009 | Neumann et al. | |
| 7,639,842 B2 | 12/2009 | Kelle et al. | |
| 7,728,833 B2 | 6/2010 | Verma et al. | |
| 7,752,018 B2 | 7/2010 | Rahmes et al. | |
| 7,787,659 B2 | 8/2010 | Schultz et al. | |
| 7,844,499 B2 | 11/2010 | Yahiro et al. | |
| 7,869,944 B2 | 1/2011 | Deaton et al. | |
| 7,873,238 B2 | 1/2011 | Schultz et al. | |
| 7,950,579 B2 | 5/2011 | Gray et al. | |
| 7,991,226 B2 | 8/2011 | Schultz et al. | |
| 7,995,799 B2 | 8/2011 | Schultz et al. | |
| 7,995,862 B2 | 8/2011 | Tao et al. | |
| 8,051,089 B2 | 11/2011 | Gargi et al. | |
| 8,068,643 B2 | 11/2011 | Schultz et al. | |
| 8,078,436 B2 | 12/2011 | Pershing et al. | |
| 8,081,798 B2 | 12/2011 | Paglieroni et al. | |
| 8,081,841 B2 | 12/2011 | Schultz et al. | |
| 8,131,514 B2 | 3/2012 | Royan et al. | |
| 8,145,578 B2 | 3/2012 | Pershing et al. | |
| 8,170,840 B2 | 5/2012 | Pershing | |
| 8,204,341 B2 | 6/2012 | Schultz et al. | |
| 8,209,152 B2 | 6/2012 | Pershing | |
| 8,233,666 B2 | 7/2012 | Schultz et al. | |
| 8,341,009 B1 | 12/2012 | Algranati | |
| 8,385,672 B2 | 2/2013 | Giuffrida et al. | |
| 8,401,222 B2 | 3/2013 | Thornberry et al. | |
| 8,417,061 B2 | 4/2013 | Kennedy et al. | |
| 8,437,554 B2 | 5/2013 | Kim et al. | |
| 8,471,854 B2 | 6/2013 | Kelley et al. | |
| 8,477,190 B2 | 7/2013 | Giuffrida et al. | |
| 8,520,079 B2 | 8/2013 | Schultz et al. | |
| 8,531,472 B2 | 9/2013 | Freund et al. | |
| 8,588,547 B2 | 11/2013 | Giuffrida et al. | |
| 8,593,518 B2 | 11/2013 | Schultz et al. | |
| 8,670,961 B2 | 3/2014 | Pershing et al. | |
| 2002/0087378 A1* | 7/2002 | Como | 705/8 |
| 2002/0143669 A1 | 10/2002 | Scheer | |
| 2002/0154174 A1 | 10/2002 | Redlich et al. | |
| 2003/0028393 A1 | 2/2003 | Coulston et al. | |
| 2003/0103651 A1 | 6/2003 | Novak | |
| 2003/0115163 A1* | 6/2003 | Moore et al. | 705/500 |
| 2003/0171957 A1 | 9/2003 | Watrous | |
| 2003/0233310 A1 | 12/2003 | Stavrovski | |
| 2005/0267657 A1 | 12/2005 | Devdhar | |
| 2005/0288959 A1 | 12/2005 | Eraker et al. | |
| 2006/0137736 A1 | 6/2006 | Nishitani et al. | |
| 2006/0200311 A1 | 9/2006 | Arutunian et al. | |
| 2006/0232605 A1 | 10/2006 | Imamura | |
| 2006/0262112 A1 | 11/2006 | Shimada | |
| 2006/0265287 A1 | 11/2006 | Kubo | |
| 2007/0179757 A1 | 8/2007 | Simpson | |
| 2008/0162380 A1 | 7/2008 | Suga et al. | |
| 2008/0221843 A1 | 9/2008 | Shenkar et al. | |
| 2010/0241406 A1 | 9/2010 | Rahmes et al. | |
| 2011/0086201 A1 | 4/2011 | Shiao et al. | |
| 2011/0096083 A1 | 4/2011 | Schultz | |
| 2011/0187713 A1 | 8/2011 | Pershing et al. | |
| 2011/0205245 A1 | 8/2011 | Kennedy et al. | |
| 2012/0035887 A1 | 2/2012 | Augenbraun et al. | |
| 2012/0191424 A1 | 7/2012 | Pershing et al. | |
| 2012/0209782 A1 | 8/2012 | Pershing et al. | |
| 2012/0223965 A1 | 9/2012 | Pershing | |
| 2013/0202157 A1 | 8/2013 | Pershing | |
| 2013/0204575 A1 | 8/2013 | Pershing | |
| 2013/0226515 A1 | 8/2013 | Pershing et al. | |
| 2013/0262029 A1 | 10/2013 | Pershing | |

FOREIGN PATENT DOCUMENTS

| | | |
|---|---|---|
| CN | 102194120 A | 9/2011 |
| DE | 198 57 667 A1 | 8/2000 |
| EP | 1 010 966 B1 | 10/2002 |
| EP | 2 251 833 A2 | 11/2010 |
| WO | 00/29806 A2 | 5/2000 |
| WO | 2005/124276 A2 | 12/2005 |
| WO | 2006/040775 A2 | 4/2006 |
| WO | 2006/090132 A2 | 8/2006 |
| WO | 2011/094760 A2 | 8/2011 |

OTHER PUBLICATIONS

"8. Epipolar Geometry and the Fundamental Matrix," retrieved Oct. 25, 2013, from http://www.robtos.ox.ac.uk/~vgg/hzbook/hzbook1/HZepipolar.pdf, 25 pages.

"AeroDach® Online Roof Evaluation Standard Delivery Format and 3D Data File," Document Version 01.00.2002 with alleged publication in 2002, 21 pages.

"AeroDach® Online Dachauswertung: Standardlieferformat und 3D-Datensatz," AEROWEST GMBH,Version 01.00.2002, 6 pages.

"Aerodach® Online Roof Analysis: Standard Delivery Format and 3D Dataset," AEROWESTGmbH, Version as of 00-01-2002, 6 pages.

"AppliCad Software and EagleView® Technologies Partner for Metal Roofing Contractors," EagleView Technologies and AppliCad Software, retrieved from blog.eagleview.com/?=614 on Feb. 1, 2012, 2 pages.

"Definitions of Surveying and Associated Terms," American Congress on Surveying and Mapping, reprinted 1989, p. 3, 2 pages.

"Glossary of the Mapping Sciences," American Society of Civil Engineering, ASCE Publications, 1994, pp. 9-10, 3 pages.

"Microsoft's MSN Virtual Earth: The Map is the Search Platform," Directions Magazine URL=http://www.directionsmag.com/article.php?article_id=873&trv=1, retrieved Feb. 6, 2009, 10 pages.

"Photo Tours Google," Web Search, retrieved Oct. 25, 2013, from http://www.google.com/search?q=photo+tours=google, 2 pages.

"Pictometry—In the News," URL=http://204.8.121.114/pressrelease%20archived/pressrelease_aec.asp, retrieved Feb. 6, 2009, 3 pages.

"Software; New Products," LexisNexis Roofing Contractor article 23(2):121(2), Jan. 3, 2006, 1 page.

"Sorcerer: Nobody builds roofs like this builds roofs," retrieved from URL=http://web.archive.org/web/2006021409237/http://www.applicad.com.au/product-features . . . on Mar. 29, 2012, 2 pages.

Aerodach, "Protokoll zur Dachauswertung," Oct. 19, 2010, 12 pages.

Aerowest GMBH, "AeroDach—das patentierte Dachaufmass," Jan. 1, 2006, retrieved from URL=http://web.archive.org/web/20060101021543/http://www.aerowest.de/aerodach.html on Mar. 25, 2012, 2 pages.

Aerowest GMBH, "Aerowest Pricelist of Geodata," Oct. 21, 2005, 2 pages.

Aerowest GMBH, "Geodata Service; AeroDach—Patented Roof Dimensions," Jan. 1, 2006, retrieved from URL=http://web.archive.org/web/20060101021543/http://www.aerowest.de/aerodach.html, on Mar. 25, 2012, 2 pages.

Aerowest GMBH. "Preisliste Geodaten Aerowest," Oct. 21, 2005, 1 page.

Agarwal et al., "Reconstructing Rome," *IEEE Computer* 43(6): 40-47, Jun. 2010.

(56) References Cited

OTHER PUBLICATIONS

Agarwal et al., "Building Rome in a Day," *Communications of the ACM* 54(10): 105-112, Oct. 2011.
Agarwala et al., "Interactive Digital Photomontage," ACM SIGGRAPH 2004, Los Angeles, CA, Aug. 2004, 9 pages.
Agarwala et al., "Panoramic Video Textures," SIGGRAPH 2005, Los Angeles, CA, Aug. 2005, 8 pages.
Appli-cad Australia, "Linear Nesting Reports," AppliCad Sample Reports, Jul. 18, 2000, 9 pages.
Appli-cad Australia, "Roof Magician: Especially suited to single, shake and tile roofing," Sample Reports, Jun. 24, 2004, 13 pages.
Appli-cad Australia, "Roof Wizard: Advanced Software for Roof Modeling and Estimating," Document Issue 1.0.0, Sep. 25, 2004, 10 pages.
Appli-cad Australia, "Roof Wizard: Especially suited to metal roofing," Generate Offcuts Reports, Mar. 9, 2005, 7 pages.
Appli-cad Australia, "Roof Wizard: Especially suited to metal roofing," Generate Offcuts Reports, Sep. 14, 2006, 7 pages.
Appli-cad Australia, "Roof Wizard: Especially suited to metal roofing," Sample Reports, Jul. 13, 2004, 24 pages.
Appli-cad Australia, "Roof Wizard: Especially suited to metal roofing," Sample Reports, Sep. 17, 2002, 12 pages.
Appli-cad Australia, "Sorcerer: Advanced Software for Roof Modeling and Estimating," Reference Guide Version 3, Sep. 8, 1999, 142 pages.
Appli-cad Australia, "Sorcerer: The complete solution for professional roof estimating," Demonstration Kit, Mar. 9, 2005, 15 pages.
AppliCad Roofing, sample report dated Jul. 30, 2007, 1 page.
Applicad Roofing, sample report dated Mar. 2, 2005, 28 pages.
AppliCad USA, "Linear Nesting Reports," AppliCad Sample Reports, Nov. 25, 1999, 9 pages.
Applicad webpage 2005 snip different color lines, 1 page.
AppliCad, "Example Output and Brochures," retrieved from URL= http://www.applicad.com/au/product-reports.html on Apr. 16, 2012, 2 pages.
AppliCad, "Product Overview—Sorcerer: Advanced Software for Roofing Modeling, Estimating, Presentation and Installation," Issue 5, Mar. 2, 2001, 15 pages.
AppliCad, "Roofing Software: Product Bulletin Section 1—Modeling the Roof," Dec. 20, 2005, retrieved from URL=htpp://web.archive.org/web/20021122204408/http://www.applicad.com.au/ on Apr. 16, 2012, 3 pages.
AppliCad, "Roofing Software: Product Bulletin Section 1—Modeling the Roof," Jan. 7, 2002, retrieved from URL=htpp://web.archive.org/web/20021122204408/http://www.applicad.com.au/ on Apr. 16, 2012, 3 pages.
AppliCad, "Roofing Software: Product Bulletin Section 2—Modifying the Model," Dec. 20, 2005, retrieved from URL=http://web.archive.org/web/20051210130430/http://www.applicad.com.au/ on Apr. 16, 2012, 2 pages.
AppliCad, "RoofScape: Advanced Software for Roof Modeling and Estimating," Learning Guide (English Units), Revision 1.1, Aug. 2007, 48 pages.
Atkinson, "Theory of Close Range Photogrammetry," Chapter 2, Section 1, Coordinate Transformations, retrieved Oct. 21, 2013, from http://www.lems.brown.edu/vision/people/leymarie/Refs/Photogrammetry/Atkinson90/C . . . , 5 pages.
Australian Office Action for Australian Application No. 2010201839, dated Apr. 14, 2011, 2 pages.
Autodesk, "Autodesk ImageModeler—Features," retrieved on Sep. 30, 2008, from http:///usa.autodesk.com/adsk/servlet/index?siteID=123112&id=115639 . . . , 1 page.
Automatic House Reconstruction, retrieved on Sep. 29, 2008, from http://www.vision.ee.ethz.ch/projects/Amobe_I/recons.html, 7 pages.
Azuma et al., "View-dependent refinement of multiresolution meshes with subdivision connectivity," *Proceedings of the Second International Conference on Computer Graphics, Virtual Reality, Visualization, and Interaction (Afigraph 2003)*, Capetown, South Africa, Feb. 2003, pp. 69-78.

Baillard et al., :Automatic reconstruction of piecewise planar models from multiple views, CVPR99, vol. 2, 1999, pp. 559-565, 7 pages.
Bazaraa et al., *Nonlinear Programming Theory and Algorithms*, Second Edition, John Wiley & Sons, Inc., New York, 1993, 330 pages.
Bhat et al., "A Perceptually-Motivated Optimization-Framework for Image and Video Processing," Computer Science & Engineering Technical Report, UW-CSE-08-06-02, University of Washington, Seattle, WA, Jun. 2008, 10 pages.
Bhat et al, "Fourier Analysis of the 2D Screened Poisson Equation for Gradient Domain Problems," ECCV 2008, 14 pages.
Bhat et al., "GradientShop: A Gradient-Domain Optimization Framework for Image and Video Filtering," ACM TOG 29(2), Mar. 2010, 14 pages.
Bhat et al., "Piecewise Image Registration in the Presence of Large Motions," CVPR 2006, New York, NY, Jun. 2006, 7 pages.
Bhat et al., "Using Photographs to Enhance Videos of a Static Scene," Eurographics Symposium on Rendering 2007, 12 pages.
Bignone et al., "Automatic Extraction of Generic House Roofs from High Resolution Aerial Imagery," *Proc. ECCV*, 1996, 12 pages.
Canadian Office Action, for Canadian Application No. 2,641,373, dated Jan. 9, 2012, 4 pages.
Capell et al., "A Multiresolution Framework for Dynamic Deformations," Computer Science & Engineering Technical Report, UW-CSE-02-04-02, University of Washington, Seattle, WA, Apr. 2002, 8 pages.
Chevrier et al., "Interactive 3D reconstruction for urban areas—An image based tool," *CAAD Futures*, 2001, 13 pages.
Chuang et al., "A Bayesian Approach to Digital Matting," IEEE Computer Vision and Pattern Recognition 2001, Kauai, Hawaii, Dec. 2001, 8 pages.
Chuang et al., "Animating Pictures with Stochastic Motion Textures," SIGGRAPH 2005, Los Angeles, CA, Aug. 2005, 8 pages.
Chuang et al., "Animating Pictures with Stochastic Motion Textures," Technical Report UW-CSE-04-04-02, SIGGRAPH 2005, Los Angeles, CA, Aug. 2005, 7 pages.
Chuang et al., "Environment Matting Extensions: Towards Higher Accuracy and Real-Time Capture," SIGGRAPH 2000, New Orleans, LA, Jul. 24-28, 2000, 11 pages.
Chuang et al., "Environment Matting Extensions: Towards Higher Accuracy and Real-Time Capture," Tech Report, SIGGRAPH 2000, New Orleans, LA, Jul. 24-28, 2000, 10 pages.
Chuang et al., "Shadow Matting and Compositing," SIGGRAPH 2003, San Diego, CA, Jul. 2003, 7 pages.
Ciarcia et al., "Automated Roof Identification Systems and Methods," U.S. Appl. No. 12/590,131, filed Nov. 2, 2009, 74 pages.
Ciarcia et al., "Automated Roof Identification Systems and Methods," U.S. Appl. No. 12/590,131, Notice of Allowance, dated Aug. 26, 2013, 9 pages.
Ciarcia et al., "Automated Roof Identification Systems and Methods," Office Action dated Jan. 9, 2013, for U.S. Appl. No. 12/590,131, 14 pages.
Ciarcia, "Systems and Methods for Point-To-Point Registration Using Perspective Imagery From Independent Sources Without Image Acquisition Metadata," U.S. Appl. No. 13/646,466, filed Oct. 5, 2012, 41 pages.
Colburn et al., "Image-Based Remodeling," IEEE Transactions on Visualization and Computer Graphics, vol. 19, No. 1, Jan. 2013, 11 pages.
Curless et al., "Better Optical Triangulation Through Spacetime Analysis," Computer Systems Laboratory Technical Report CSL-TR-95-667, Stanford University, Stanford, CA, Apr. 1995, 12 pages.
Curless et al., "Computer model and 3D fax of Happy Buddha," retrieved Oct. 25, 2013, from http://www-graphics.stanford.edu/projects/faxing/happy/, 4 pages.
Curless et al., "A Volumetric Method for Building Complex Models from Range Images," SIGGRAPH '96, New Orleans, LA, Aug. 4-9, 1996, 10 pages.
Curless et al., "Better Optical Triangulation through Spacetime Analysis," 1995 5$^{th}$ International Conference on Computer Vision, Boston, MA, Jun. 20-23, 1995, 8 pages.

(56) References Cited

OTHER PUBLICATIONS

Curless, "New Methods for Surface Reconstruction from Range Images," Dissertation, Submitted to the Department of Electrical Engineering and the Committee of Graduate Studies of Stanford University, Jun. 1997, 209 pages.

Curless, "From Range Scans to 3D Models," *ACM SIGGRAPH Computer Graphics* 33(4): 38-41, 1999.

Debevec et al., "Modeling and Rendering Architecture from Photographs: A hybrid geometry- and image-based approach," *SIGGRAPH conference proceedings*, retrieved from www.cs.berkeley.edu/~malik/papers/debevecTM96.pdf., 1996, 10 pages.

Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages.

Drawing received Jan. 31, 2012.

*Eagle View Tech.* v. *Aerialogics LLC*, Case No. 2:12-cv-00618-RAJ, Prior Art Presentation, Aug. 17, 2012, 61 pages.

ECE 390, Introduction to Optimization, Spring 2004, Introductory Course, retrieved Oct. 25, 2013, from http://liberzon.csl.illinois.edu/04ECE390.html, 1 page.

Ekman, "Price Estimation Tool," Office Action for U.S. Appl. No. 13/843,437, dated Aug. 14, 2013, 9 pages.

Falkner et al., *Aerial Mapping 2nd Edition*, Lewis Publishers (CRC Press LLC), 2002, "Chapter 11—Aerotriangulation," 23 pages.

Faugeras et al., "3-D reconstruction of Urban Scenes from Sequences of Images," Institut National De Recherche En Informatique Et En Automatique, No. 2572, Jun. 1995, 27 pages.

Faugeras, "What can be seen in three dimensions with an uncalibrated stereo rig?," *Computer Vision—ECCV* '92: 563-578, 1992. (18 pages).

Fisher et al., *Dictionary of Computer Vision and Image Processing*, John Wiley & Sons, Ltd., West Sussex, England, 2005, 182 pages.

Fritsch, "Introduction into Digital Aerotriangulation," Photogrammetric Week '95, Wichman Verlag, Heidelberg, 1995, pp. 165-171, 7 pages.

Furukawa et al., "Manhattan-world Stereo," CVPR 2009, Miami, Florida, Jun. 2009, 8 pages.

Furukawa et al., "Reconstructing Building Interiors from Images," ICCV 2009, Kyoto, Japan, Sep. 2009, 8 pages.

Furukawa et al, "Towards Internet-scale Multi-view Stereo," CVPR 2010, Jun. 2010, 8 pages.

Georgeiv et al., "Spatio-Angular Resolution Tradeoff in Integral Photography," Proceedings of Eurographics Symposium on Rendering, 2006, 10 pages.

GEOSPAN Corporation, "Digital Geo-Referenced Oblique Aerial Imagery Solution EPP-REP No. 8444 5/13," GEO-NY0000868, 2007, 28 pages.

Goesele et al., "Multi-View Stereo for Community Photo Collections," Proceedings of ICCV 2007, Rio de Janeiro, Brazil, Oct. 2007, 8 pages.

Goesele et al., "Multi-View Stereo Revisited," CVPR 2006, New York, NY, Jun. 2006, 8 pages.

Goldman et al., "Interactive Video Object Annotation," Computer Science & Engineering Technical Report, UW-CSE-07-04-01, University of Washington, Seattle, WA, Apr. 2007, 7 pages.

Goldman et al., "Schematic Storyboarding for Video Editing and Visualization." SIGGRAPH 2006, Boston, MA, Aug. 2006, 10 pages.

Goldman et al., "Shape and Spatially-Varying BRDFs From Photometric Stereo," IEEE Transactions on Pattern Analysis and Machine Intelligence, vol. 32, No. 6, Jun. 2010, 12 pages.

Goldman et al., "Shape and Spatially-Varying BRDFs From Photometric Stereo," ICCV 2005, Beijing, China, Oct. 2005, 8 pages.

Goldman et al., "Video Object Annotation, Navigation, and Composition," UIST 2008, 10 pages.

Gonzalez et al., *Digital Image Processing*, Addison-Wesley Publishing Company, Inc., Reading, Massachusetts, 1993, 372 pages.

Gülch et al., "On the Performance of Semi-Automatic Building Extraction," In the International Archives of Photogrammetry and Remote Sensing, vol. 23, 8 pages, 1998.

Gupta et al., "Enhancing and Experiencing Spacetime Resolution with Videos and Stills," Computer Science & Engineering Technical Report, UW-CSE-04-08-01, University of Washington, Seattle, WA, Apr. 2008, 6 pages.

Gupta et al., "DuploTrack: A Real-time System for Authoring and Guiding Duplo Block Assembly," UIST 2012, Boston, MA, Oct. 2012, 13 pages.

Gupta et al., "Enhancing and Experiencing Spacetime Resolution with Video and Stills," ICCP 2009, San Francisco, CA, Apr. 2009, 9 pages.

Gupta et al., "Single Image Deblurring Using Motion Density Functions," ECCV 2010, Crete, Greece, Sep. 2010, 14 pages.

Hartley et al., "2.4 A Hierarchy of Transformations", Multiple View Geometry in Computer Vision, Cambridge University Press, Second Edition, 2003, 9 pages.

Hartley et al., "Appendix 6: Iterative Estimation Methods," Multiple View Geometry in Computer Vision, Cambridge University Press, Second Edition, 2003, 34 pages.

Hartley et al., "Invariant and Calibration-Free Methods in Scene Reconstruction and Object Recognition," Final Technical Report, Feb. 28, 1997, 266 pages.

Hartley et al., *Multiple View Geometry in Computer Vision*, Second Edition, Cambridge University Press, Cambridge, England, 2003, 672 pages.

Held et al., "3D Puppetry: A Kinect-based Interface for 3D Animation," UIST 2012, Boston, MA, Oct. 2012, 11 pages.

Henricsson et al., "3-D Building Reconstruction with ARUBA: A Qualitative and Quantitative Evaluation," Institute of Geodesy and Photogrammerty, Swiss Federal Institute of Technology, 2001, 13 pages.

Hudson, "Merging VRML Models: Extending the Use of Photomodeller," Thesis, in TCC 402, Presented to the Faculty of the School of Engineering and Applied Science, University of Virginia, Mar. 23, 1998, 23 pages.

International Preliminary Report on Patentability for International Application No. PCT/US2011/023408, dated Aug. 16, 2012, 7 pages.

International Search Report and Written Opinion for International Application No. PCT/US2013/023502, dated Apr. 30, 2013, 8 pages.

International Search Report for International Application No. PCT/US11/23408, dated Aug. 11, 2011, 2 pages.

International Search Report for International Application No. PCT/US2013/023503, dated Apr. 30, 2013, 5 pages.

Kolman, "Chapter 4, Linear Transformations and Matrices, 4.1: Definition and Examples," Elementary Linear Algebra, Second Edition, Macmillan Publishing Co,. Inc., 1997, 12 pages.

Krainin et al., "Autonomous Generation of Complete 3D Object Models Using Next Best View Manipulation Planning," ICRA 2011, Shanghai, China, May 2011, 7 pages.

Kushal et al., "Photo Tours," 3DimPVT, Oct. 2012, 8 pages.

Levoy et al., "The Digital Michelangelo Project: 3D Scanning of Large Statues," SIGGRAPH 2000, New Orleans, LA, Jul. 24-28, 2000, 14 pages.

Levoy, "The Digital Michelangelo Project," retrieved Oct. 25, 2013, from http://www-graphics.stanford.edu/projects/mich/, 10 pages.

Li et al., "Automated Generation of Interactive 3D Exploded View Diagrams," ACM Transactions on Graphics 27(3), SIGGRAPH 2007, Aug. 2007, 7 pages.

Li et al., "Interactive Cutaway Illustration of Complex 3D Models," ACM Transactions on Graphics 26(3), SIGGRAPH 2007, Aug. 2007, 11 pages.

Lueders, "Infringement Allegations by EagleView Technologies," Feb. 10, 2009, 3 pages.

Mahajan et al., "A Theory of Frequency Domain Invariants: Spherical Harmonic Identities for BRDF / Lighting Transfer and Image Consistency," IEEE Pattern Analysis and Machine Intelligence, 30(2), Feb. 2008, 14 pages.

(56) References Cited

OTHER PUBLICATIONS

Mahajan et al., "A Theory of Spherical Harmonic Identities for BRDF/Lighting Transfer and Image Consistency," ECCV 2006, Graz, Austria, May 2006, 14 pages.
Mann, "Roof with a view," *Contract Journal* 431(6552):29, Nov. 23, 2005, 2 pages.
Mikhail et al., *Introduction to Modern Photogrammetry*, John Wiley & Sons, Inc., New York, 2001, 247 pages.
Miller et al., "Miller's Guide to Framing and Roofing," McGraw Hill, New York, pp. 131-136 and 162-163, 2005, 9 pages.
Minialoff, "Introduction to Computer Aided Design," Apr. 2000, 4 pages.
Noronha et al., "Detection and Modeling of Buildings from Multiple Aerial Images," Institute for Robotics and Intelligent Systems, University of Southern California, Nov. 27, 2001, 32 pages.
Noronha et al., "Detection and Modeling of Buildings from Multiple Aerial Images," *IEEE Transactions on Pattern Analysis and Machine Intelligence* 23(5):501-518, 2001, 32 pages.
Office Action received in Reexamination of U.S. Pat. No. 8,078,436 B2, Supplemental Reexamination Patent, dated Jul. 25, 2013, 72 pages.
Office Action received in Reexamination of U.S. Pat. No. 8,145,578 B2, Supplemental Reexamination Patent, dated Jul. 25, 2013, 24 pages.
Pershing et al., "Aerial Roof Estimation System and Method," Notice of Allowance dated Feb. 3, 2012, for U.S. Appl. No. 12/148,439, 35 pages.
Pershing et al., "Aerial Roof Estimation System and Method," Office Action dated Apr. 25, 2011, for U.S. Appl. No. 12/148,439, 52 pages.
Pershing et al., "Aerial Roof Estimation System and Method," Office Action dated Aug. 16, 2010, for U.S. Appl. No. 12/148,439, 47 pages.
Pershing et al., "Aerial Roof Estimation System and Method," Office Action dated Aug. 25, 2011, for U.S. Appl. No. 12/148,439, 77 pages.
Pershing et al., "Aerial Roof Estimation System and Method," Office Action dated Oct. 10, 2012, for U.S. Appl. No. 13/371,271, 7 pages.
Pershing et al., "Aerial Roof Estimation System and Method," Notice of Allowance dated Jul. 29, 2013, for U.S. Appl. No. 13/371,271, 15 pages.
Pershing et al., "Aerial Roof Estimation System and Method," U.S. Appl. No. 60/925,072, filed Apr. 17, 2007, 16 pages.
Pershing et al., "Aerial Roof Estimation System and Methods," Office Action dated Aug. 28, 2012, for U.S. Appl. No. 13/287,954, 12 pages.
Pershing et al., "Aerial Roof Estimation System and Methods," Office Action dated May 22, 2013, for U.S. Appl. No. 13/287,954, 25 pages.
Pershing et al., "Aerial Roof Estimation Systems and Methods," Notice of Allowance dated Oct. 14, 2011, for U.S. Appl. No. 12/253,092, 30 pages.
Pershing et al., "Aerial Roof Estimation Systems and Methods," Office Action dated May 10, 2011, for U.S. Appl. No. 12/253,092, 26 pages.
Pershing et al., "Automated Techniques for Roof Estimation," U.S. Appl. No. 61/197,895, filed Oct. 31, 2008, 32 pages.
Pershing et al., "Geometric Correction of Rough Wireframe Models Derived From Photographs," U.S. Appl. No. 61/300,414, filed Feb. 1, 2010, 22 pages.
Pershing, "Concurrent Display Systems ANF Methods for Aerial Roof Estimation," Notice of Allowance dated Feb. 16, 2012, for U.S. Appl. No. 12/467,250, 19 pages.
Pershing, "Concurrent Display Systems ANF Methods for Aerial Roof Estimation," Office Action dated Sep. 7, 2011, for U.S. Appl. No. 12/467,250, 14 pages.
Pershing, "Concurrent Display Systems and Methods for Aerial Roof Estimation," Office Action dated Aug. 28, 2012, for U.S. Appl. No. 13/474,504, 8 pages.
Pershing, "Concurrent Display Systems and Methods for Aerial Roof Estimation," Office Action dated Jun. 19, 2013, for U.S. Appl. No. 13/474,504, 14 pages.
Pershing, "Pitch Determination Systems and Methods for Aerial Roof Estimation," Notice of Allowance dated Feb. 16, 2012, for U.S. Appl. No. 12/467,244, 20 pages.
Pershing, "Pitch Determination Systems and Methods for Aerial Roof Estimation," Office Action for U.S. Appl. No. 13/438,288, Aug. 24, 2012, 8 pages.
Pershing, "Pitch Determination Systems and Methods for Aerial Roof Estimation," Office Action dated May 21, 2013, for U.S. Appl. No. 13/438,288, 11 pages.
Pershing, "Pitch Determination Systems and Methods for Aerial Roof Estimation," Office Action dated Aug. 26, 2011, for U.S. Appl. No. 12/467,244, 17 pages.
Pershing, "User Interface Techniques for Roof Estimation," U.S. Appl. No. 61/197,904, filed Oct. 31, 2008, 62 pages.
Pershing, "Systems and Methods for Estimation of Building Floor Area," Office Action for U.S. Appl. No. 13/757,712, dated Jul. 18, 2013, 18 pages.
Pershing, "Systems and Methods for Estimation of Building Wall Area," Office Action for U.S. Appl. No. 13/757,694, dated Oct. 8, 2013, 15 pages.
PhotoModeler, "Measuring & Modeling the Real World," retrieved Sep. 30, 2008, from http://www.photomodeler.com/products/photomodeler.htm, 2 pages.
Pictometry Online, "Government" Oct. 7, 2008, retrieved Aug. 10, 2011, from http://web.archive.org/web/20081007111115/http:/www.pictometry.com/government/prod . . . , 3 pages.
Pictometry, "Electronics Field Study™ Getting Started Guide," Version 2.7, Jul. 2007, 15 pages.
Pictometry, "FAQs," Sep. 22, 2008, retrieved on Aug. 10, 2011, from http://www.web.archive.org/web/20080922013233/http://www.pictometry.com/about_us/faqs.sht . . . , 3 pages.
Pictometry.com, "Frequently Asked Questions," May 24, 2005, retrieved Mar. 28, 2012, from URL=http://web.archive.org/web/20050524205653/http://pictometry.com/faq.asp, 9 pages.
Pictometry.com, "Frequently Asked Questions," retrieved on Apr. 9, 2011, from http://replay.waybackmachine.org/20050801231818/http:///www.pictometry.com/faq.asp, 10 pages.
Pictometry.com, "Frequently Asked Questions," retrieved on Aug. 1, 2005, from http://replay.waybackmachine.org/20050801231818/http:///www.pictometry.com/faq.asp, 10 pages.
Pictometry.com, "Frequently Asked Questions," retrieved on Feb. 10, 2012, from http://replay.waybackmachine.org/20050801231818/http:///www.pictometry.com/faq.asp, 6 pages.
Pictometry.com, "Pictometry Announces Software and Web-based Solution for Engineers, Architects, and Planners," Press Release, Jan. 22, 2004, 3 pages.
Poullis et al., "Photogrammetric Modeling and Image-Based Rendering for Rapid Virtual Environment Creation," http://handle.dtic.mil/100.2/ADA433420, 1998, 7 pages.
Precigeo.com, "Welcome to precigeoRoof," URL=http://web.archive.org/web/20070106063144/roof.precigeo.com, retrieved Apr. 30, 2009, 1 page.
Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works" and :Welcome to precigeoRisk, retrieved on Aug. 14, 2010, from http://web.archive.org, pp. 6-11, 11 pages total.
Precigeo.com, "Welcome to precigeo™," URL=http://web.archive.org/20080110074814/http://www.precigeo.com, retrieved Feb. 17, 2009, 1 page.
Precigo.com, "How precigeoRoof Works," URL=http://web.archive.org/web/20070107012311/roof.precigeo.com/how-precigeo-roof-works.htm, retrieved Apr. 30, 2009, 2 pages.
Reddy et al., "Frequency-Space Decomposition and Acquisition of Light Transport under Spatially Varying Illumination," ECCV 2012, Florence, Italy, Oct. 2012, 15 pages.
RoofCAD, "Satellite Takeoff Tutorial-Pitched Roof," received Jan. 31, 2012, 25 pages.

(56) References Cited

OTHER PUBLICATIONS

Scholze et al., "A Probabilistic Approach to building Roof Reconstruction Using Semantic Labeling," *Pattern Recognition 2449/2002*, Springer Berlin/Heidelberg, 2002, 8 pages.
Schutzberg et al., "Microsoft's MSN Virtual Earth: The Map is the Search Platform," *Directions Magazine*, retrieved Feb. 6, 2009, from http://www.directionsmag.com/article.php?article_id=873&try=1, 10 pages.
Seitz et al., "A Comparison and Evaluation of Multi-view Stereo Reconstruction Algorithms," CVPR 2006, New York, NY, Jun. 2006, 8 pages.
Shan et al., "Refractive Height Fields from Single and Multiple Images," CVPR 2012, Providence, RI, Jun. 2012, 8 pages.
Shan et al., "Refractive Height Fields from Single and Multiple Images," CVPR 2012, Providence, RI, Jun. 2012, poster, 1 page.
Sorcerer software screenshot, modified on Sep. 6, 2012, 1 page.
Transcriptions of points of potential interest in the attached YouTube video titled: "Pictometry Online Demo," retrieved Feb. 25, 2010.
University of Washington, College of Arts & Sciences, Mathematics, Course Offerings, Autumn Quarter 2013 and Winter Quarter 2014, retrieved Oct. 25, 2013, from http://www.washington.edu/students/crscat/math.html, 16 pages.
U.S. Appl. No. 60/425,275, filed Nov. 8, 2002, 32 pages.
Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.
Weeks et al., "A Real-Time, Multichannel System with Parallel Digital Signal Processors," *Proceedings of IEEE International Conference on Acoustics, Speech and Signal Processing (ICASSP 1990)* 3: 1787-1790, Apr. 1990.
Wolf, *Elements of Photogrammetry*, McGraw-Hill Kogakusha, 1974, "Chapter Fourteen: Aerotriangulation; 41-1 Introduction," pp. 351-352, 3 pages.
Wood et al., "Surface Light Fields for 3D Photography," SIGGRAPH 2000, New Orleans, LA, Jul. 24-28, 2000, 10 pages.
Written Opinion for International Application No. PCT/US11/23408, dated Aug. 11, 2011, 5 pages.
Written Opinion for International Application No. PCT/US2013/023503, dated Apr. 30, 2013, 4 pages.
Written Opinion for International Application No. PCT/US2013/023502, dated Apr. 30, 2013, 3 pages.
Wu et al., "Multicore Bundle Adjustment," CVPR 2011, Colorado Springs, CO, Jun. 2011, 8 pages.
Wu et al., "Schematic Surface Reconstruction," CVPR 2012, Providence, RI, Jun. 2012, 1 page.
www.archive.org Web site showing alleged archive of PhotoModeler Web Site http://www.photomodeler.com/pmpro08.html from Feb. 9, 2006 (retrieved Oct. 21, 2013), 4 pages.
www.archive.org Web site showing alleged archive of German Aerowest Web Site http://aerowest.de/ from Feb. 6, 2006 (retrieved Sep. 20, 2012) and translated to English, 61 pages.
www.archive.org Web site showing alleged archive of German AeroDach Web Site http://www.areodach.de from Jun. 13, 2004 (retrieved Sep. 20, 2012) and translations to English, 21 pages.
YouTube, "Pictometry Online Demo," DVD, Feb. 25, 2010.
YouTube, "Pictometry Online Demo," retrieved on Feb. 6, 2006, from http://www.youtube.com/watch?v=jURSKo0OD0, 1 page.
Zhang et al., "Rapid Shape Acquisition Using Color Structured Light and Multi-Pass Dynamic Programming," International Symposium on 3D Data Processing Visualization and Transmission, Padova, Italy, Jun. 2002, 13 pages.
Zhang et al., "Shape and Motion Under Varying Illumination: Unifying Structure from Motion, Photometric Stereo, and Multi-view Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-09-03-02, 2002, 8 pages.
Zheng et al., "Parallax Photography: Creating 3D Cinematic Effects form Stills," Proceedings of Graphics Interface 2009, Kelowna, BC, CA, May 2009, 8 pages.
Ziegler et al., "3D Reconstruction Using Labeled Image Regions," Mitsubishi Research Laboratories, http://www.merl.com, Jun. 2003, 14 pages.
Zongker et al., "Environment Matting and Compositing," SIGGRAPH '99, Los Angeles, CA, Aug. 9-13, 1999, 10 pages.

\* cited by examiner

PRICE ESTIMATION MODEL

BACKGROUND

Technical Field

This disclosure is in the field of aggregating pricing information from many different sources in real time from different geographical areas into a centralized database that provides accurate estimates for material and labor costs for insurance claims adjusting and contractor bid estimates.

Description of the Related Art

When insured property is damaged and requires repair, a claims adjuster will refer to costing information to in an effort to determine an accurate repair cost. For example, the claims adjuster will wish to calculate the cost of materials, labor, markup and other costs in order to assign a correct overall value to settle the claim. If estimates are too low the insurance company risks customer dissatisfaction by underpaying the claim. If estimates are too high the company will pay out more money than required to repair the property, hurting the company's profits. Similarly, contractors bidding for a repair contract wish to have accurate costing information to make estimates that are high enough to cover their costs and make a profit, yet not too high so that the contractors bid is uncompetitive. Traditionally, insurance companies and contractors have based costing information on previous repair claims and estimates or on catalog prices for materials from distributors, both of which may be out of date, and may not apply to where the damaged property is located.

BRIEF SUMMARY

The present disclosure proposes systems and methods to create an integrated centralized database that aggregates costing data in real time and provides an accurate repair cost estimating platform. In one or more embodiments, this data is based on data collected from repair estimates that have been done by actual roofing contractors who have actually performed repairs; data from third-party data sets such; data from material suppliers from companies like Home Depot, Lowes, and others; data from specialty providers of selected products; and materials description information from manufacturers. Some of this data is regularly published, and some is collected in real time. The data might also be associated with a unique geographic area to provide accurate costing information for repairs in that area.

Recently, it has become possible to improve the accuracy of roof measurements through remote image acquisition, using a computer assisted roof estimation system. Thus, it is now possible to obtain actual roof dimensions and generate a roof estimation report without relying on a human estimator to be present at a building site. Even if a building is significantly damaged, satellite photos or aerial images saved in a database can provide accurate views of the building as it was, prior to a damage incident. Furthermore, if two or more current or previous views of the same roof are available, for example, an orthogonal (top plan) view and at least one oblique (perspective) view, a 3D image of the roof can be computer-generated. Such a 3D rendering allows obtaining actual dimensions of a complex roof that can be used to accurately calculate replacement costs. Such methods are described in U.S. Pat. Nos. 8,078,436 and 8,170,840.

As described below, actual roof dimensions can then be used to provide a more accurate computer assisted estimate of the full replacement costs. Instead of simply applying a generic estimate based on roof size, shape and expected labor and material costs, this computer collection and centralized data base approach can take into account more of the relevant factors, including the current labor price in a specific geographic area, the most current actual material costs, any expect mark up the roofing contractor on material and labor, which may vary from area to area and from time to time, along with many other factors. The resulting estimate for replacement costs is can therefore be more accurate, less expensive, and faster than using using material cost and labor prices that are updated once per quarter or collected only from sellers and not from buyers.

The fully integrated method can be summarized as including the acts of receiving a data set from a large number of the actual roofing contractors as they prepare an live roof replacement estimate, any entries made by these roofing contractors for their estimate costs, including labor and materials, any mark ups of each, then, if the estimates costs change on a particular project, receiving immediately the update estimated costs, then once the actual costs known, obtain the actual costs, in addition, obtain both actual selling material costs form sellers and the buying material costs from the buyer.

Embodiments of a method of computing an expected replacement cost can include a model that takes into account different most expense estimate along with least expensive case factors for the amount and type of each roof material used and labor, together with an actual average and also obtain an expected range of replacement costs with a reasonable tolerance factor. The calculation can also take into account expected waste of material to be incurred during installation of the building material.

DETAILED DESCRIPTION

Figure 1:
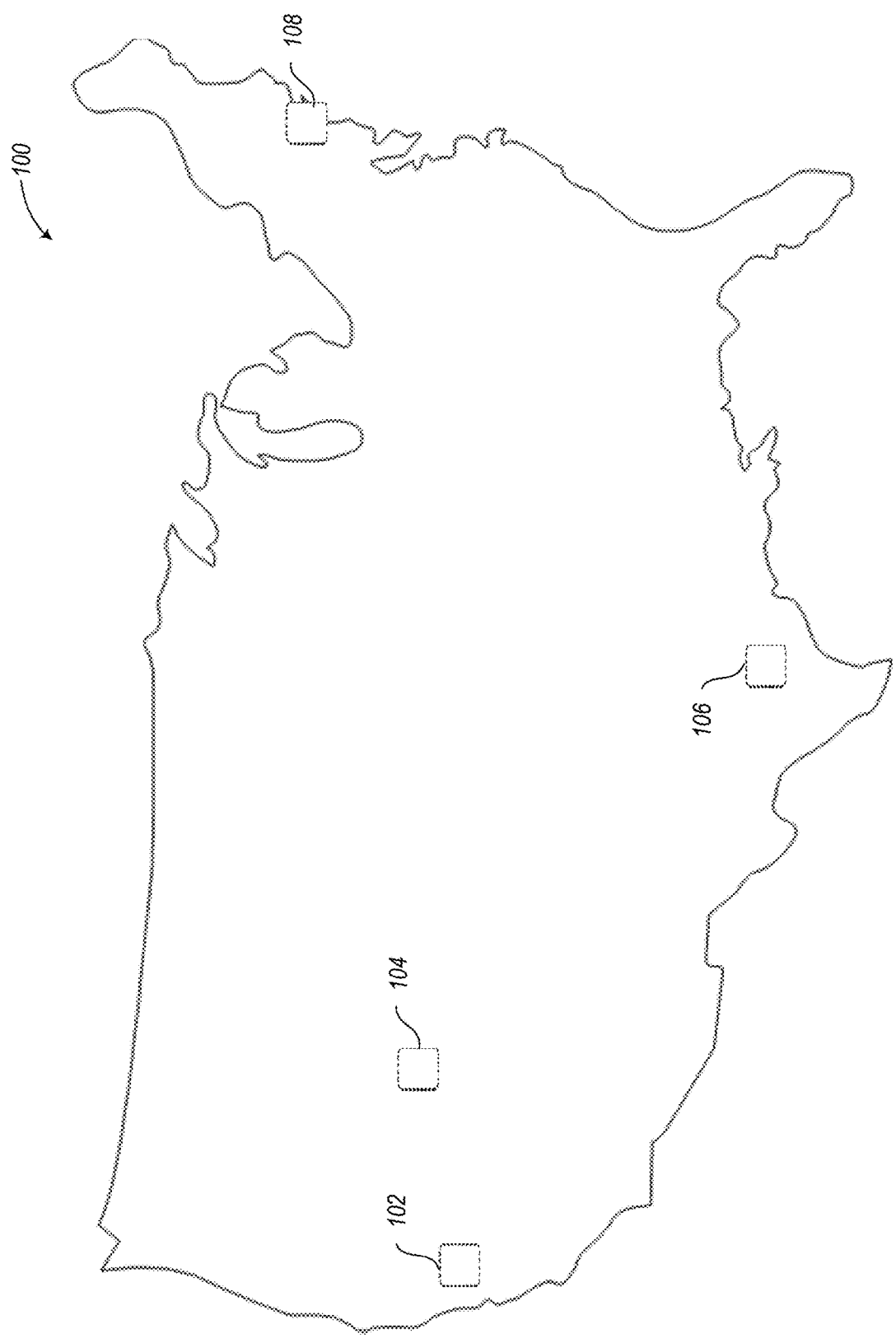
FIG. 1 is a diagram showing four example geographic areas with costing data within the United States.

Accurate costing estimates for materials and labor are important to the insurance industry for properly adjusting property damage claims and also to individual contractors who are bidding for contacts to repair the property damage. It is often difficult to obtain an accurate cost estimate of the actual price for each of the large number of individual materials that go into a repair bid. Although distributors commonly have catalogs that describe the prices of the materials they sell, these prices may be out of date when used at a later time by the contractor or insurance adjuster, and in addition the quantities available for each desired item may be limited. Similarly, the cost for labor may also be difficult to estimate due to fluctuating supply and demand in a particular geographic area or within a particular specialty area such as roofing, sheet rock, or tiling.

In addition, events within a particular geographic area can quickly cause unforeseen movements in the costs for materials, labor, and contractor markup. For example, a huge hailstorm or tornado in a particular geographic area may destroy many thousands of roofs on residential and commercial buildings. In such a case, it would be very difficult to purchase shingles or roof nails in the coming days and weeks since the local supplies would be consumed quickly. As a result of such natural disasters, the cost of acquiring materials and labor for repair contracts would quickly become very high. Furthermore, as an influx of materials and labor made its way to the damaged area, pricing for materials and labor would likely remain volatile for a long period of time. To know the accurate cost to timely replace a roof, an insurance company would need access to current, accurate pricing data in order to properly adjust property damage claims. Similarly, contractors bidding on repair contracts would need to understand the spot market prices for materials and labor and how those prices may adjust over the next several days or weeks in order to place competitive bids that will also make money for the contractor.

An insurance company also realizes that completing a repair quickly, even if it needs to pay a premium price, may have significant benefits. Not only will their customers be pleased and keep their business with the insurance company, they will refer their friend to the same agent. Further, if a roof is repaired quickly, before the next heavy rainstorm, this will avert a higher claim that might include carpets, ovens, appliances, kitchen cabinets and other household items. It will also the avoid the costly and time consuming process of having to adjust a claim payment that was based on a first lower price as an estimate but ended up costing significantly more when the work was completed. Thus, if an insurance company is aware that the price of goods and services has truly increased greatly in a short period of time, they will be willing to pay the higher price to ensure that the repair is timely completed and properly paid for to obtain a number of benefits, even though the price they are asked to pay is outside their expected pricing models. On the other hand, the insurance company does not wish to pay excessive fees for materials and labor that are outside the normal for the market and are unwarranted. The insurance company therefore has significant benefits in knowing current real price models as well as trends.

Time of year also plays a role in price fluctuations. For example, in certain geographic areas such as North Dakota and northern Montana with harsh winters, the price of labor may rise considerably during the wintertime because of the difficulty of performing outdoor projects in the cold and snow and the shortage of labor. Areas in the southern United States in more temperate climates, such as Texas and Arizona, might see the price of labor drop in the winter time as more workers travel south in the winter and rise in the summer when there is very hot weather outside and the labor pool is spread out over a wider area. Some areas will see less variations in labor rates.

FIG. 1 shows diagram 100 which shows an example of a few geographic areas within the United States. Shown are the, greater Sacramento area 102, the greater Salt Lake City area 104, the greater Dallas area 106, and the greater Long Island area 108. These are just a few examples and many other markets could be considered distinct geographic areas. In one or more embodiments, the areas contiguous and are defined in the United States by a ZIP code. They can be grouped by single ZIP Codes. Alternatively, adjacent ZIP codes can be combined in types of estimation.

In a preferred embodiment, the ZIP code of the construction site is the area by which the reports and data are sorted. They can be up to about 90,000 ZIP codes in the U.S. and currently there are about 45,000 distinct ZIP codes in the U.S. The data is sorted as ZIP code of the construction location rather than the material seller's ZIP code or the contractor's ZIP code. The goal of the insurance adjustor is to understand the accurate cost to replace or repair the damaged building. Therefore, the data that is sorted according to the location of the damage building will be the most reliable and likely to result in the most accurate repair estimate, even though the contractor and the seller of materials may live in different ZIP codes.

In another embodiment there may be over 450 such geographic areas within the United States. Each geographic area can be selected, grouped and sorted based on market boundaries such that the pricing for individual materials, labor, and other related charges, for example contractor overhead and profit, are generally consistent within that area. This can be determined by monitoring the cost and pricing trends across the United States and then selecting the boundaries and size of the areas based on those geographic locations which have common features in a second embodiment.

Figure 2:
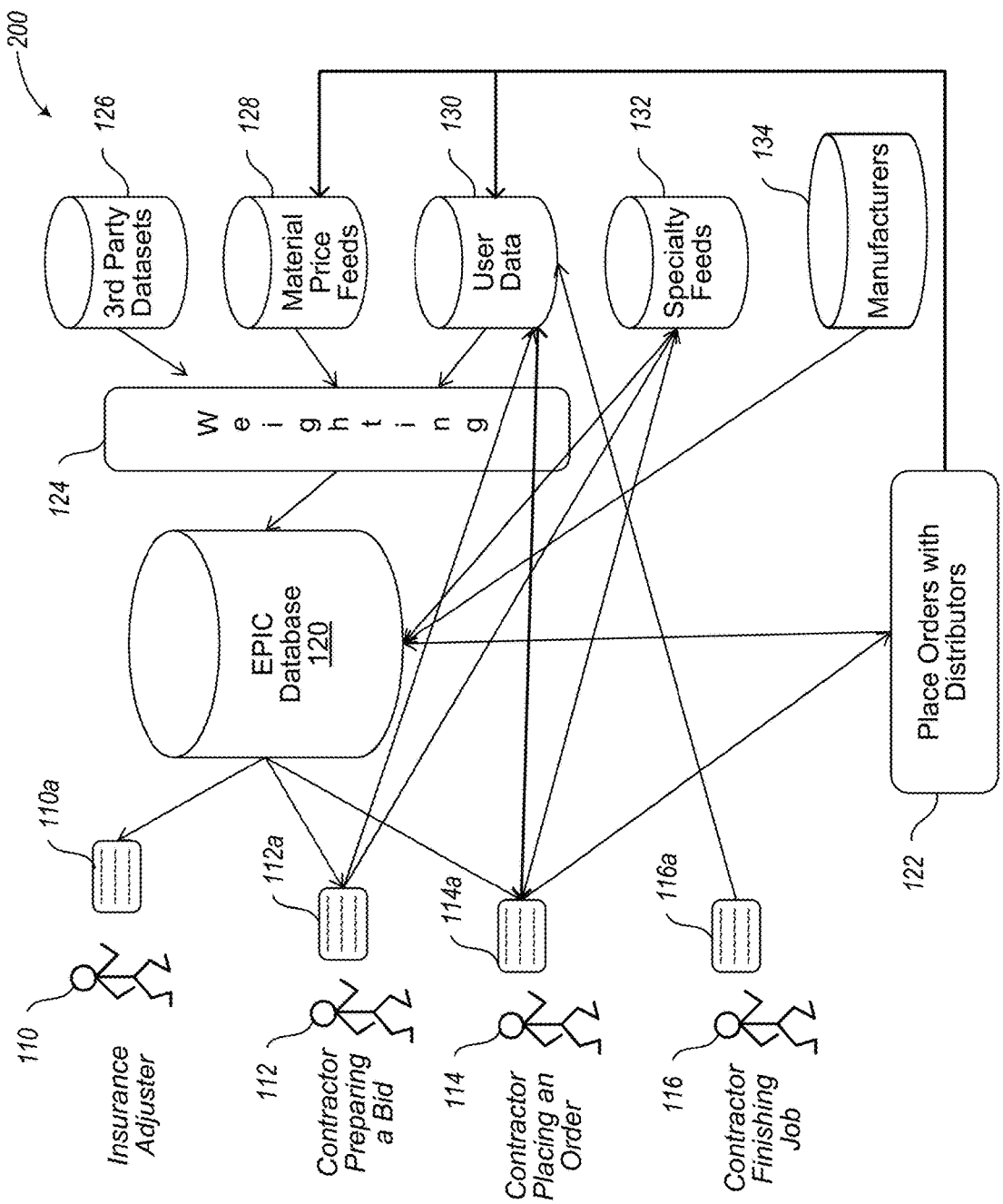
FIG. 2 is a block diagram that shows an embodiment of the relationship between an integrated costing database, database users, and various data sources.

FIG. 2 shows block diagram 200 which describes an embodiment of an environment in which the integrated costing database 120 is used. Integrated costing database 120 includes current and historical pricing data for materials, labor, contractor overhead and profit, and other costs related to contractor projects. Examples of materials include but are not limited to shingles for a roof, roofing nails, plywood, siding, insulation, drywall, drywall nails, drywall mud, tape, paint, and the like. Materials may also include tools such as hammers, power saws, ladders, brushes, and other tools that may be used to complete the project that may appear in a project bid. The number of discrete materials that are represented in the database may exceed several hundred items. The integrated costing database 120 tracks the current and historical materials pricing data for each product in each geographic area.

Database 120 receives its data from a number of different sources, some of which are updated in real time and some of which are updated on a less frequent, but periodic basis. Examples and sources of different data that are input to data base 120 will now be provided One source of data of construction and material costs comes from third party data sets 126. These are industry-wide data providers that publish material and labor costs on a regular schedule, such as 4 times year, that covers certain for geographic areas. This published data represents cost figures that were as accurate as possible at time they were published, however may be anywhere from a few days to several weeks out of date. Although this data may provide a useful baseline for producing a cost estimate, it may not take into account current market forces within an area that have caused recent cost volatility.

Another source of data for database 120 comes from actual material costs from the sellers of products. These might be in the form of price feeds 128 from materials distributors such as Home Depot, Allied, Lowes and others who sell products in the construction industry. Distributors acquire products from multiple manufacturers and resell those products to end consumers, contractors, or other businesses. These distributors have large databases that manage and track the inventory levels and pricing data for every item that is sold in any store operated by the distributor. In some embodiments this pricing data includes the advertised price for the item as well as the actual price for which the item was sold. The data might be available for an individual store, a group of stores in a geographic area of the same chain, or many types of stores in that area. Many distributors regularly publish a materials price report feed that discloses the distributor's complete pricing data information for products it sells to the construction industry. This published data from multiple distributors is also put into the data in material price feed database 128. This database might be updated monthly, weekly, daily, depending on the database, the geographic location and number stores and other factors. It might, in some cases, be available in real time as prices within a distributors individual store changes.

Another source of data for database 120 comes from purchaser data base, which could be consider a user data 130 since they are the users of the material in the labor repair. In a preferred embodiment, user data 130 is data taken directly from contractors who are either preparing a bid for a repair contract or have finished performing a repair contract and are entering in final cost data. In one example, contractor 112 is preparing a bid to submit to a customer to repair damage to the customer's property. In the bid, the contractor would typically describe the scope of the work, timeframe for completing the work, a list of materials needed to complete the project, a quote for the cost of materials, an estimate of the labor needed to complete the project, a quote for the cost of that labor, and other costs including tax, permit fees, and other related costs. The bid amount also includes a markup amount on some of the products and labor in order to cover the contractors overhead. It might also include some factor to provide a profit to the contractor. Typically, overhead and profit are included as a multiplier mark-up to the material and labor cost. For example, if a bid has $5,000 in material costs and $10,000 in labor costs and the markup multiplier is 1.2, or 20%, then the bid will list the materials estimate as $6,000 and labor estimate as $12,000.

The assignee of the present application, Eagle View Technologies, has filed a number of applications on various software products that assist contractors in preparing bids to repair roofs, install siding and perform construction products. The issued patents include U.S. Pat. Nos. 8,170,840; 8,078,436 and the pending applications include Ser. Nos. 13/757,694 and 13/757,712 both of them filed on Feb. 1, 2013 and naming Chris Pershing as an inventor. The patents and applications provide examples of reports that are supplied to contractors to assist them in preparing construction bids. According to one embodiment of the present invention, the contractor can receive these reports as an active computer data file rather than a .pdf or paper printout. With the active computer file, he can enter data regarding the bid he is providing the home owner and the insurance company. The contractor will use graphics user interface screen 112*a* to enter this estimated bid data into the user data database 130. Examples of such user interface screens are explained in more detail later herein and provided as FIGS. 3-5. If the contractor 116 wins the bid and performs the repair, when the job is complete the contractor can also enter the final cost numbers into the database so he can print the final bill for the customer and/or insurance company. He may also be required to provide receipts that show the actual cost of the materials purchased for the work project. These numbers, entered just as the project is completed, often on the same day, will reflect actual true cost, not just the bid estimate. They will also usually include the actual mark-up, any discounts the contractor received on the materials and labor, any unexpected expenses, higher prices or overages experienced. All this is entered into the user data database 130 using graphical user interface 116*a*.

There is a significant advantage of using actual material and price cost data from contractors who have actually purchased materials and labor, and have actually completed repairs on a property within a geographic area. This cost data represents the closest approximation to a "spot" price for materials and labor in that geographic area, and also provides additional related data such as contractor markup, permit fee amounts, and other expenses actually incurred by the contractor. An advantage of incorporating purchasers' data 130 as user data into the integrated costing database 120 is that the more frequently contractors enter their material and labor cost into this data feed, the more accurate contractor repair estimates will become for a geographic area. In addition, the greater the numbers that other contractors enter data into this data feed, the more reliable it will be.

The user data base 130 will therefore usually include data that has been input from three different sources, the contractor 112 preparing the bid, the contractor 114 who is placing an order and the contractor 116 who has finished a job and is preparing a report to be paid for his work. In some cases, these will be different groups and represent different data sets. For example, many contractors might prepare bids for the same project, but usually only one will get the job. Similarly, a contractor might bid on dozens of projects in a single day, but only win the contract and place the order for a few contracts. The data in which the contractor bid on a project, but did not get the work is valuable data, but should be viewed differently, and weighted differently, then data entered by a contractor who made the bid and got the work. It is usually the case that the contractor who placed the order will also be the contractor who finishes the job and inputs the actual, end of project data.

In one embodiment, there are separate software engines for the contractor and insurance carrier to interact with the EPIC database 120. The user interface 110*a* will have different entries and data search capabilities that the user interfaces 112*a*, 114*a* and 116*a*. The insurance adjustor will generally have a additional access to more data sets, grouping of data, weighting factors and all the may have the ability to vary the weighting factors. The insurance company and employees thereof, as represented by 110, will be able to select specific ZIP codes for the data to be provided, based on the construction location. They may also have the ability to modify it to sort by the ZIP code of the contractor, the product distributor. In one embodiment, they can look at adjacent ZIP codes to understand pricing patterns and also save money by having contractors work on projects in a ZIP codes, but use a pricing model for an adjacent ZIP which has a lower construction cost.

In one embodiment, the data input to the data base 130 will also be from the insurance adjustor 110 via his computer report interface 110a. This would be in the form of the payment actually approved by the insurance company and the amount paid out for the work performed. Thus, in one embodiment, the insurance adjustor 110 only views the data and makes decisions regarding the payment of claims, in other embodiments, the decision to accept a bid and price that was accepted, together with the cost data of each item on the winning bid is returned to the system from the insurance adjustor interface 110a to the user data base 130. This can therefore be an important source of data to future insurance adjustors 110 or to contractors 112 who are preparing bids and wish to see which bids have been winning bids in the past.

The collection of data from all these sources into a single data base is a significant benefit in providing a more accurate output report to the viewer and has significantly more value than is available to insurance adjustors and other viewers in the market today.

Database 120 can therefore contain at least four types of cost related data, all of which can be organized based on geographic areas. The four types of cost related data include the price at which the supplier sells the goods to buyers, the price that buyers estimate they will need to pay for these goods, the actual price that the buyers to pay for the goods and then the price the buyers, sold the goods to the end customer, the home owner. In the construction and roofing business, the seller or supplier might be at any one of the manufacturer, wholesale, distributor level or retail level. The buyer might be a contractor or large construction company and the buyer might be the home owner or insurance company. Since a contractor in most cases first provides an estimate of the bid before doing the work and then an actual work report with receipts after the job is completed, these are two types of cost data than can be compared and used to more accurately understand the market as well as market dynamics. In addition, since price data from both the seller of goods and buyer of goods is being received and tracked, these provide additional types of data that can be compared and organized in a useful manner, as described and claimed herein. The inventors have therefore recognized that organizing data according to geographic regions that includes the price at which the product was sold as one data entry, the price at which it is expected to be bought as a different data entry, the price at which it was really bought as a different data entry, the price at which it was sold again to the end user as a different data entry has particular benefits in being able to understand the market and also pricing trends in the market.

While it would be expected that the price at which a product is sold and the price at which it is bought will be same, this is not always the case when large amounts of data are concerned, particularly when individual purchases are not tracked but rather the but rather a large amount of sell data and buy data are obtained and compared. Obtaining this data from both the buyer and the seller who are each entering it into a common data base, grouped by geographic area thus provides insights into the market, including actual costs and price pressures and market dynamics. Another source of data for database 120 comes from specialty feeds 132. These specialty feeds represent subcontractors that provide specialty services for a repair contract. For example, there are some organizations that provide specific construction and restoration work. There is an organization of textile restoration experts that inventory and restore garments and fabric items affected by fire, smoke, water, mold or other contaminants. This type of restoration work is typically not done by a contractor bidding for a repair job; rather the contractor works directly with a local certified restoration drycleaner as a subcontractor. There are other contractors who provide restoration of water damaged basements, smoked damage kitchens, ceiling or other household items. In some embodiments, data in the specialty feeds 132 comes from two principal sources, data including prices for each geographic area received periodically from various specialty publications as part of the data feed, and data including prices paid by individual contractors for work subcontracted to specific certified restoration companies. Yet another potential source of data for database 120 comes from manufacturer feeds 134. This data typically does not include cost or pricing data, but does include individual product descriptions, product information, SKU numbers, product pictures, and the like. In some embodiments this data is used within database 120 to provide additional descriptive product information along with associated cost information. The data might, in some cases, include a price at which the manufacturer sold the product to its customer, which might be wholesaler, distributor or retail store.

In a preferred embodiment, a weighting 124 is applied to one or more of the data sources to determine an expected final cost estimate amount for a material item cost stored in the integrated costing database 120. The purpose of the weighting is to create a more accurate material and labor estimates for a geographic area by making adjustments of the data sources depending on data characteristics, for example how current the data from the data feed is and recent changes and trends in that same type or related types of data.

For example, FIG. 2 shows that data received from third party data sets 126, from material price feeds 128, and from user data 130 is subject to data weighting 124. In one embodiment, the weighted averages are calculated by applying percentages distributed over the respective three data sets such that the total percentages add up to 100%. In one example it might be that in St. Louis, Mo. 25-Year Charcoal 3-Tab Shingles from a particular manufacturer appear as $25 per bundle in third-party data set 126, $30 per bundle in material price feeds 128, and $45 per bundle in user data 130. In addition, suppose the weightings were applied at 25% to third-party data set 126, 25% to material price feeds 128, and 50% to user data 130. The resulting price estimate stored in integrated costing database 120 would be $36.25 for 3-Tab Shingles in St. Louis ($25*25%+$30*25%+$45*50%).

In a preferred embodiment, these weighting factors are customizable, and can be varied. In one embodiment, the weighting factors are varied based on the age of the data. They might be initially set depending on the real-time status of each of the data sources. For example, if there data that is available from third-party data sets 126 is 1 week since it was current and the material price feeds 128 are 14 weeks since they were current and there are few or no user price feeds, the integrated costing database 120 estimate for a material item could be determined entirely (100%) from the most recent third party data set 126. In another example, if there is no real time third party data available, but it is 11 weeks old and user data 130 is available that is 3 days old, then the database 120 estimate for a material item could be 20% from the most recent third-party data set 126, and 80% from user data 130.

The weighting of accepted bids from insurance adjustors 110 might also be of a high value, depending on the viewer. For example, a contractor who is preparing a bid may wish to see an aggregation of accepted bids sorted by insurance companies, by individual adjustors, by geographic region or other sort. The contractor would wish to know the time difference between a bid was submitted and when it was accepted to understand how current each of them are, as well as the actual date of approval compared to the date of new bid he is now submitting. For example, a bidding contractor 112 may benefit from viewing insurance adjustor 110 accepted bids from a geographic region that is less than seven days old, but may gain little to no benefit from accepted bids in a different geographic region or that is more than 20 days old in a rapidly moving market.

The data base also recognizes the difference between data that was current, live data when input but is now several weeks old. For example, user purchase data will generally always be current on the date it is entered. Two weeks later, the very same data will be recognized as data of the type that is current data, but it is two weeks old. This is different from data that was two weeks old on the date it was first entered. For example, if a quarterly data report issues on October 15, to include the data collect in the third quarter, July 1 to September 30, it was two weeks old as aggregated data on the date it was entered, but in fact some of the data in the set is three months and two weeks old, some is two months old and some is a month old since some of the data would have been collected on July 1, some on July 15, and some in August and September. Thus, actual third quarter data entered on October 15 might be considered by the supplier to be current data, but in fact it was, on average, over two months old on the date it was entered. Thus, there will be recognition that data which is newly entered as current data is not the same as data that is newly entered as several weeks old data. The meaning of data that is two weeks old can vary, depending on whether the date is regarded as date it was entered or what the date it represented when it was entered. These characteristics can also be used in determining the weighting factors.

In other embodiments, these weighting factors can be determined, customized, and used in various ways. For example, the weighting factors may differ based on geographic area where distributor coverage may not be as broad, material type where certain materials such as a special grade of plywood may have a greater price variability, time of year such as the beginning of summer when labor rates rapidly increase, known natural disasters such as hailstorm's or hurricanes within one or more geographic areas quickly raising the price of roofing materials, and the like.

In one embodiment, data from specialty feeds 132 is not weighted, rather the individual items and costs are sent directly to the integrated costing database 120 and provide as raw data at the output. In this case, the cost data provided for subcontractor services, such as for certified restoration companies will be best represented by the latest subcontractor quote in that geographic area. FIG. 2 illustrates examples in which weighting may or may not be used on various types of data. In the example shown, weighting is performed on third party data 126, material price feeds 128, user data 130, but not on specialty feeds 132 nor manufacturers feeds 134. This is one preferred embodiment since the specialty feeds are most like true, out of pocket costs and the manufacturers feed either does not contain costs at all, and if it does, the costs are not likely to be related to the cost the end consumer pays when the repair is carried out. Thus, there are reasons to provide the raw data, unweighted. Of course, the weighting can be applied to the specialty feeds 132 and 134 in other embodiments. Further, the data from any one of the data sets 126, 128 and 130 can be provided unweighted as well.

Whether the data is weighted or not is also tracked and can be reported (but is not required to be reported) as part of the output so that the viewer has information that assists him in making a decision.

Whether the data has been weighted is supplied as information to the viewer of the output, whether it be the insurance adjustor 110, the contractor 112, the contractor 114 and the contractor 116.

The weighting is illustrated in FIG. 2 as occurring between the user data base 130 and the full data base set 120, which is one preferred location. The data can be tagged and tracked back to each of the sources 112, 114 or 116 to weight each of these data inputs differently. For example, the weighting can take place prior to entering the data base 130 instead of as it exits data base 130 or both. In a preferred embodiment, an insurance adjuster 110 who is preparing a claim for damage to an insured property in a geographic area would use the integrated costing database 120 for the most accurate estimates for materials and labor costs to determine the proper amount to settle the claim. In one embodiment insurance adjuster 110 uses graphical user interface 110*a* to access database 120 most accurate cost estimates for repairs in that geographic area.

In one or more embodiments, when contractor 114 has won a bid for a repair project that was previously submitted to a property owner or an insurance adjuster, the contractor uses graphical user interface screen 114*a* to access database 120 for final pricing information and to order materials.

The data can also be output as data trends for particular types of data. For example, one output can be user data 130 that is listed on the output screen as being input as current data some of which is now two weeks, some is three weeks old and some is four weeks old.

The data output from the EPIC database 120 can be obtained at a number of different levels and sorted by different characteristics and weighting factors. One example of an output is the report obtained at 110*a* by the insurance adjustor 110. The insurance adjustor can ask for report 110*a* that contains the data from each of the various sources 126-134 with equal weights applied to them. He can also obtain a report that contains data that was considered current data when it was newly entered, and obtain this data that has been input over a several week time span. In other embodiments, the insurance adjustor 110 has the ability to modify the requested report 110*a* to obtain only user data 130, just material price feed data 128 or various weightings of these in a single report, with the weighting being accomplished based on the characteristics as explained herein.

The insurance adjustor may also go into the system and perform a reconciliation for a construction project. In some cases, the repair is started or even completed and then it is learned the bid approved is not correct for the actual job costs. For example, the price of roofing shingles might have spiked recently so that the insurance price is low. The inventive system will greatly reduce the occurrence of such reconciliation reports since the insurance adjuster 110 will have more accurate, real time data. Even so, there might be incorrect costs approved. Therefore, the insurance adjustor can enter the interface 110*a* and perform a reconciliation.

Any such reconciliation that is done by the insurance adjustor will be input to the database 120, either directly or through the user database 130. The insurance company will be able to acquire the data for reconciliations, even by ZIP code, so that they can better understand the accurate price of a construction project. Thus, when a reconciliation is requested, prior to it being approved, the insurance adjuster 110 can consult the data base 120 and determine whether they have been any or many such reconciliations in this ZIP code or adjacent ZIP codes. He can give these a high weighting, for example 100%. He can then study this data to determine whether a reconciliation on the product under question is appropriate and if so, approve one. The ability to input, store, weight and sort reconciliation data with original bid data, order data and finishing data provides significant benefits over those obtainable in the prior art.

Figure 3:
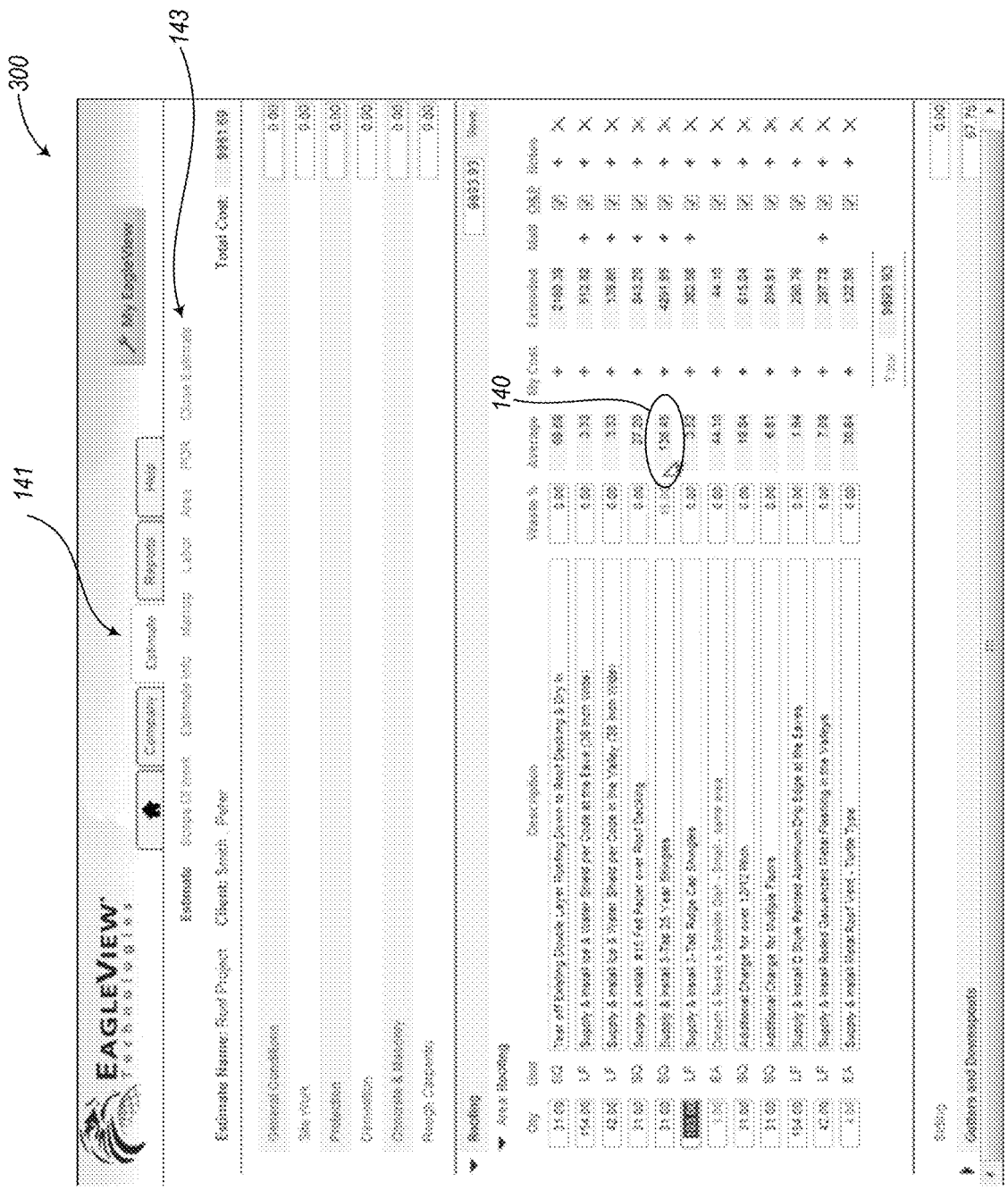
FIG. 3 shows a screenshot of an embodiment of a user interface to access to the integrated costing database.

FIG. 3 shows screen 300 which is an example graphical user interface screen found on 114*a* used to access the integrated costing database 120 to determine the average estimated costs. As can be seen, the tab 141 opened at the top screen states: "Estimate". There can also be tabs for "Order" which mean to place an order, screen 114*a*, and tabs for "Report", which mean to report a completed job, screen 116*a*, to enter actual completed job cost data and submit a report to be paid. Thus, the contractor can interact as an estimating contractor 112 on a first screen 112*a*, a ordering contractor 114 on screen 114*a* and a finishing contractor using reporting menu tab on screen 116*a*. The user data base 130 will keep track of enter the data in the appropriate location based on whether the input screen is in menu 112*a*, 114*a* or 116*a*. 140 shows an average estimated contractor price to supply and install 3-Tab 25 Year Shingles on a building for $138.45 for labor and materials per square, with 31 squares estimated to be ordered. When the order is actually placed, a new screen will be provided under the "Order" menu that will be the actual to be placed and transmitted from the contractor 114 to the distributor of the building products 122 who will ship and sell the building supply products to the contractor based on this order being placed. (While the tab "Order" is not shown in FIG. 3, it can be present as a menu selection in some embodiments and will be a parallel menu tab with the Estimate and Reports tabs.) As the distributor actually ships and sells these products to the contractor 114, this data is also entered into the user data base 130, providing another input of real time data. When the distributor outputs general pricing information instead of actual live shipment data, this is provided to the material price feeds data base 128, as shown by the arrows in FIG. 2.

As can also be seen in FIG. 3, there is a line 143 for additional menu items and tabs that can be entered for the Scope of Work, Estimate info in which the contractor can obtain information to assist him in making a bid, a Markup tab, a Labor tab, an Area tab, a PQR tab and a Close Estimator tab.

In these other tabs, such as Order, Report, Estimate info, Labor and the like, different options and descriptions are provided to permit the viewer, in this case the contractor, to obtain the data that has been described herein or to input data, place an order for goods or submit a bid to an insurance adjustor. Thus, this single, unitary computer and database system, as shown in more detail in FIG. 6 herein, permits the viewer to obtain and act on data in either the role of contractor or insurance adjustor. Thus, which each has a different interface engine, they are benefitting from using a common database and thus can be more accurate in the data obtained, reported and sorted. And, if an insurance adjustor, they can act in the role of reviewing multiple bids or accepting bids or making adjusts to bids. If in the role of a contractor, as one that is preparing a bid, placing an order after having won a bid or having completed a project and is reporting a finished order and wishing to be paid. The single unitary database system of FIGS. 2-6 therefore provides a complete solution to both contractors and insurance adjustors. Given the description here as provided, a programmer of skill in this art would be able to set up the tabs and menus to achieve the results as described and therefore to avoid many pages of computer screen shots and explanations, the screen shot of FIG. 3 is provided. It is to be understood that similar input screens and menus and tabs will be provided to achieve the functions as described herein and that this could be accomplished by those of skill in the art given this disclosure and explanation.

Figure 4:
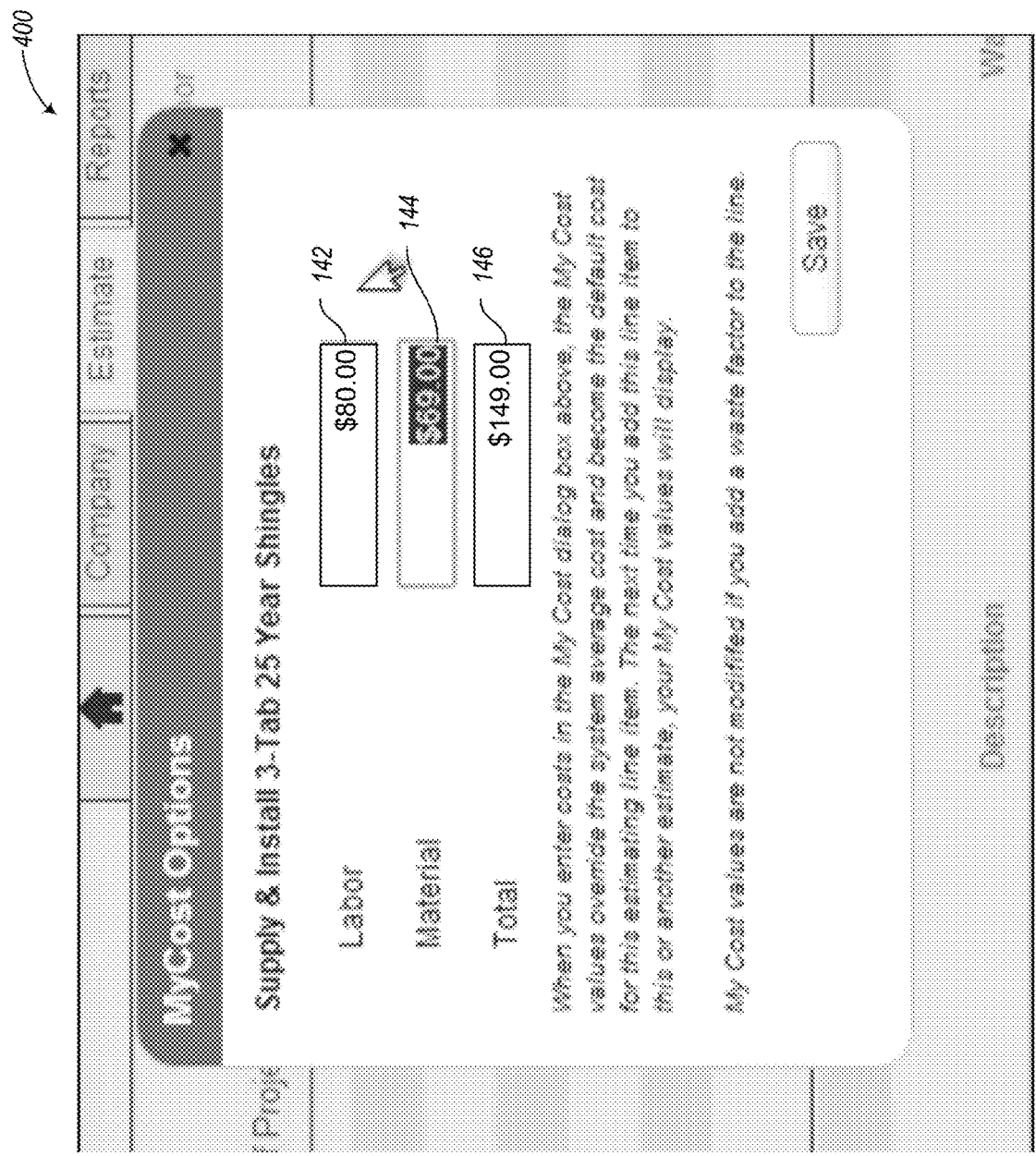
FIG. 4 shows a screenshot of an embodiment of a user interface to update the cost for an item.
Figure 5:
FIG. 5 shows an embodiment of a user interface to place an order for an item directly from a supplier.

FIG. 4 shows screen 400 which is an example of a screen displayed when area 140 is selected and will be displayed in more detail, with additional input options. Using this screen, the contractor is able to override the estimated costs provided by database 120 and enter the contractor's own estimates for labor and material per unit of order, in this case per square of material. Here, the contractor has entered $80 for labor 142, and $69 for material 144. The system will automatically update the total 146 to $149. Similar entry of data is permitted in the other rows and columns of FIG. 3 and FIG. 4 is provided as one example of how a particular data entry can be enlarged and modified and the types of input that can be made on different screens. FIG. 5 shows screen 500 which is an embodiment of the screen displayed when a contractor wishes to add a material item to his purchase order from a distributor to be ready to make a purchase. When the contractor is finished updating material and labor costs for all the items the contractor wishes to purchase, the order is placed with the appropriate distributors 122. Any materials ordered in this manner will eventually update the material price feed 128 that is provided by the distributor on a regular basis to update this data base. When the actual order is filled and the product shipped, the price at which it is really shipped will be input to the user data base 130 or to the price feed data base 128 or both, depending on the embodiment. If any subcontractor services are ordered through the distributor, the cost information for that subcontractor service will update the specialty feeds database 132. Therefore, there is an option to update only one the data bases 128 or 130, or to update both based on actual sale information by the distributor. formation 128. The embodiment of FIG. 2 is therefore to be understood as showing an example of one embodiment, but modifications can be made within the spirit and scope of this invention to obtain the data from different sources than the arrows shown and provide it to different databases and parties than the arrows shown.

Figure 6:
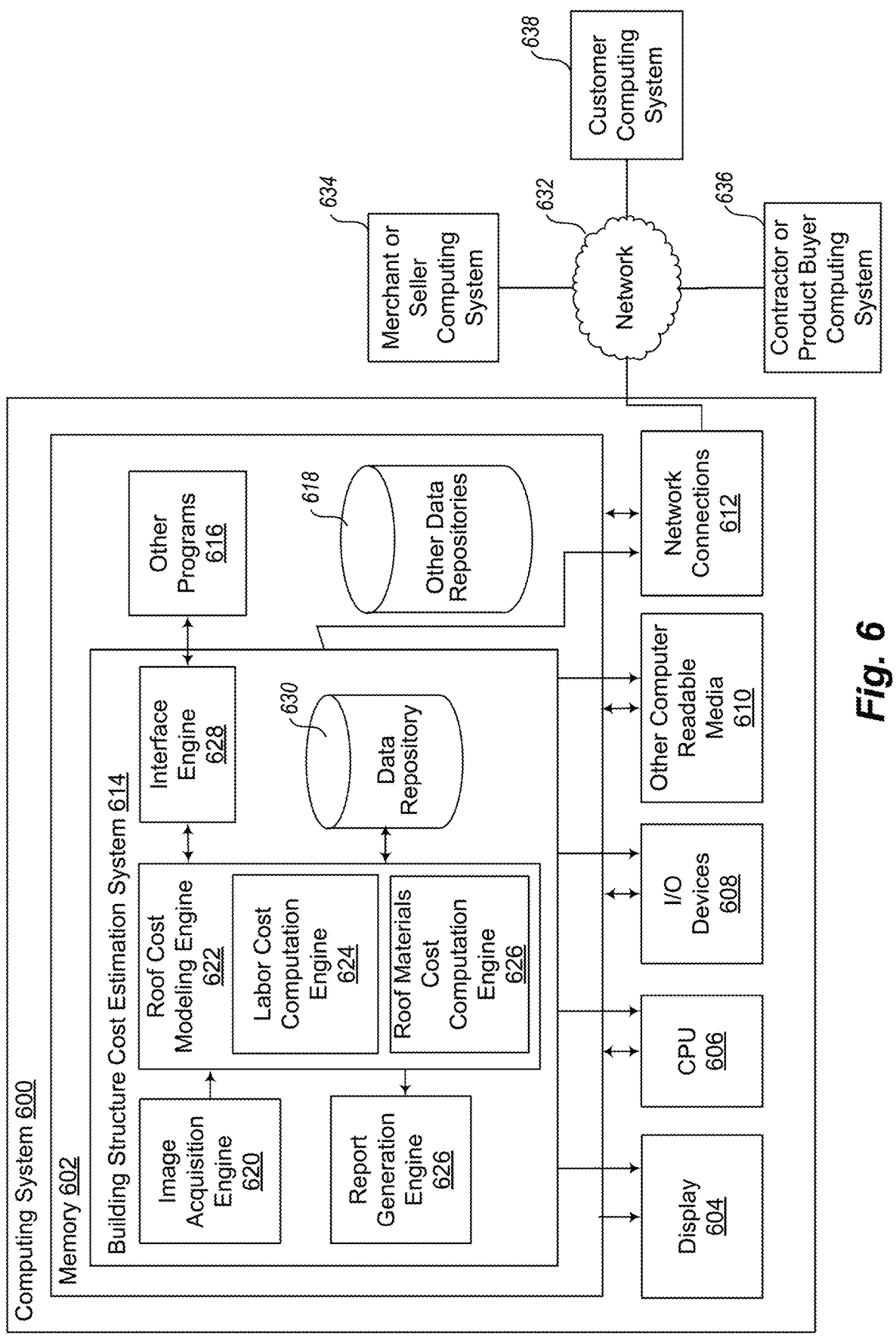
FIG. 6 is a block diagram of a computing system for practicing embodiments of a roofing replacement estimation method presented herein, according to one embodiment.

FIG. 6 shows one embodiment of a block diagram of a computer hardware system to obtain and described herein provide enhanced computer- and network-based methods, techniques, and systems for building structure estimation employing perspective imagery from independent sources.

FIG. 6 is therefore one example block diagram of a computing system 600 for practicing embodiments of the statistical point pattern matching method described herein, and for practicing embodiments of a building structure estimation system based on the point pattern matching, according to one embodiment.

One or more general purpose or special purpose computing systems may be used to implement the computer- and network-based methods, techniques, and systems for point pattern matching computation described herein and for practicing embodiments of a building structure estimation system based on the point pattern matching. More specifically, the computing system 600 may comprise one or more distinct computing systems present at distributed locations. In addition, each block shown may represent one or more such blocks as appropriate to a specific embodiment or may be combined with other blocks. Moreover, in one example embodiment, the various components of a Building structure estimation system 614 may physically reside on one or more machines, which use standard inter-process communication mechanisms (e.g., TCP/IP) to communicate with each other. Further, the Building structure estimation system 614 may be implemented in software, hardware, firmware, or in some combination to achieve the capabilities described herein.

Examples of computing systems and methods to obtain a roof report are shown and described in detail in U.S. Pat. Nos. 8,078,436 and 8,170,840 and these can be used as one component of the present embodiment, as well as other roof report generation systems. For completeness, one potential system for creating such a report will be described herein as follows.

In the embodiment shown, the computing system 100 comprises a computer memory ("memory") 602, a display 604, one or more Central Processing Units ("CPU") 606, Input/Output devices 608 (e.g., keyboard, mouse, joystick, track pad, CRT or LCD display, and the like), other computer-readable media 610, and network connections 612. A building structure estimation system 614 is shown residing in the memory 602. In other embodiments, some portion of the contents or some or all of the components of the building structure estimation system 614 may be stored on and/or transmitted over the other computer-readable media 610. The components of the building structure estimation system 614 preferably execute on one or more CPUs 606 and generate roof estimate reports, as described herein. Other code or programs 616 (e.g., a Web server, a database management system, and the like) and potentially other data repositories, such as data repository 618, also reside in the memory 602, and preferably execute on one or more CPUs 606. Not all of the components in FIG. 6 are required for each implementation. For example, some embodiments embedded in other software do not provide means for user input, for display, for a customer computing system, or other components. Currently, some inputs to the building structure estimation system 614 are automatically generated, but other inputs may be entered manually to supplement data acquired through automated means. Further automation of the building structure estimation system, including automation of roof materials overage estimation is a goal addressed by the method described herein, along with other methods.

In a typical embodiment, the building structure estimation system 614 includes an image acquisition engine 620; a roof modeling engine 622; a point pattern matching computation engine 624, and a roof materials overage computation engine 625 within, or as part of, the roof modeling engine 622; a report generation engine 626, an interface engine 628, and a data repository 630. Other and/or different modules may be implemented. In addition, the building structure estimation system 614 interacts via a network 632 with an image source computing system 634, an operator computing system 636, and/or a customer computing system 638. Communication system 632 may utilize one or more protocols to communicate via one or more physical networks, including local area networks, wireless networks, dedicated lines, intranets, the Internet, and the like.

The image acquisition engine 620 performs at least some of the functions described herein, with respect to the processes described herein. In particular, the image acquisition engine 620 interacts with the image source computing system 634 to obtain one or more images of a building, and stores those images in the building structure estimation system data repository 630 for processing by other components of the building structure estimation system 614.

The roof modeling engine 622 performs at least some of the functions described with reference to FIGS. 1-5, previously introduced. In particular, the roof modeling engine 622 generates a model based on one or more images of a building that are obtained from the building structure estimation system data repository 630 or directly from the image source computing system 634. As noted, model generation may be performed semi-automatically, based on at least some inputs received from the operator computing system 636.

In addition, at least some aspects of the model generation may be performed automatically. In particular, to generate a 3D model, the roof modeling engine 622 may use output from the point pattern matching computation engine 624 which employs variational analysis to compute a point-to-point probability spread function. The point-to-point probability spread function can be used to estimate which individual points on one image of the building most likely match corresponding points on another image of the building (i.e., the point pattern matching computation engine endeavors to "optimize" point matching associations). This estimation may be based on adaptive predominance voting probabilities generated from shape pattern matches. The shape pattern matches can be created by comparing combinations of points on an orthogonal view of the building with specific other points on an oblique view of the building, and as further described herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Figure 7:
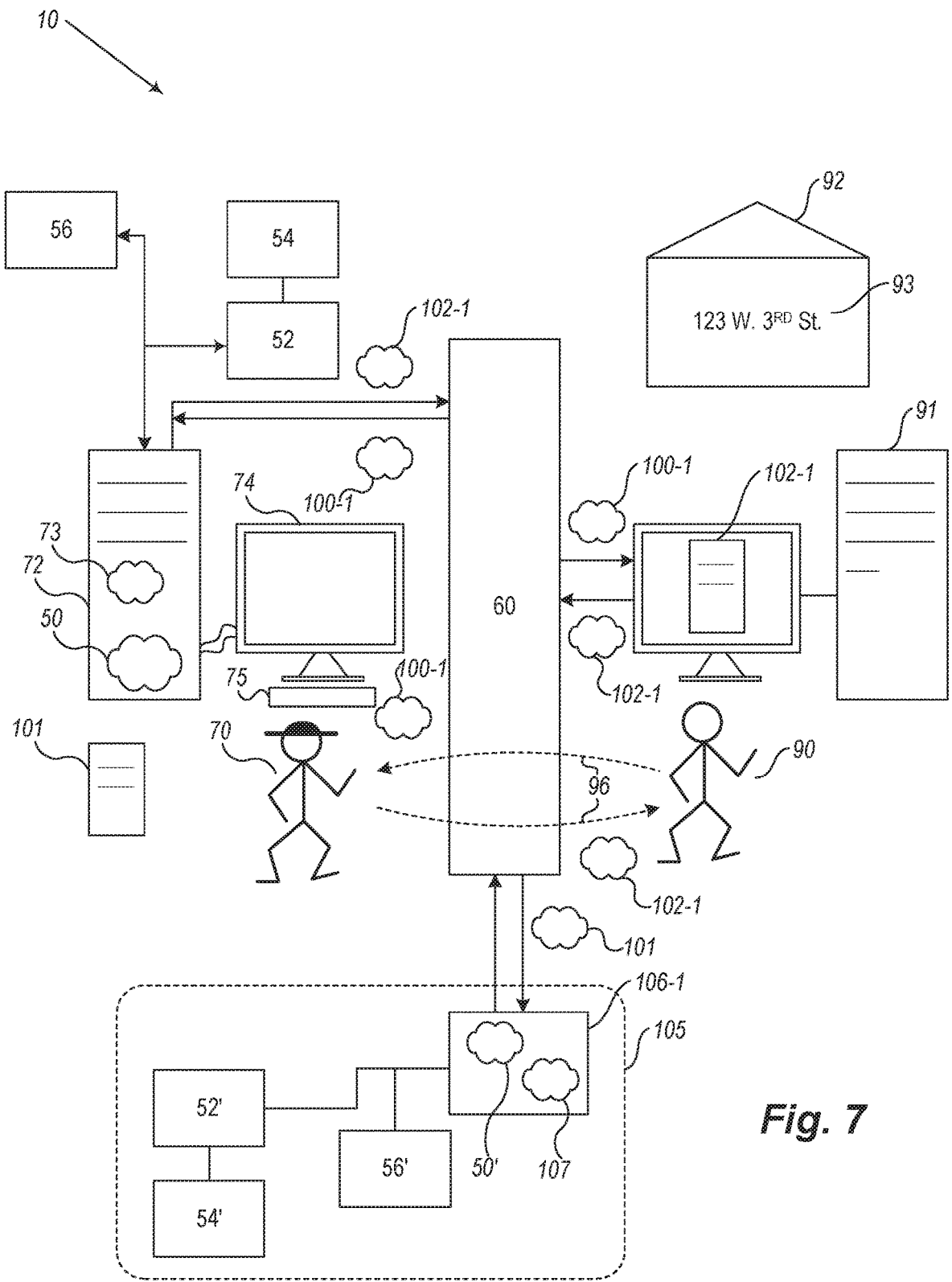
FIG. 7 is an illustration showing embodiments of a system and method for roof estimation.
Figure 8:
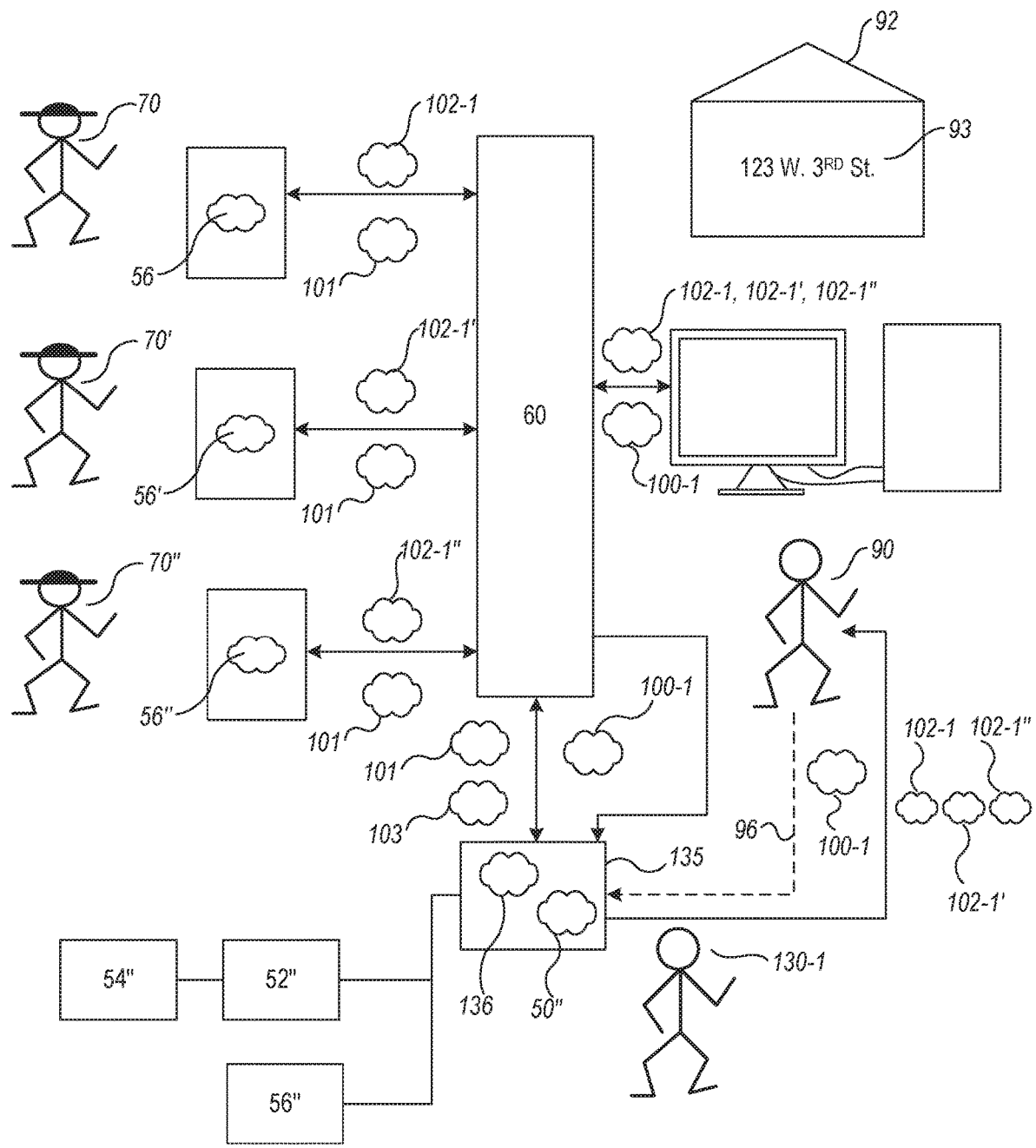
FIG. 8 is an illustration showing another embodiment of a system and method for roof estimation.
Figure 9:
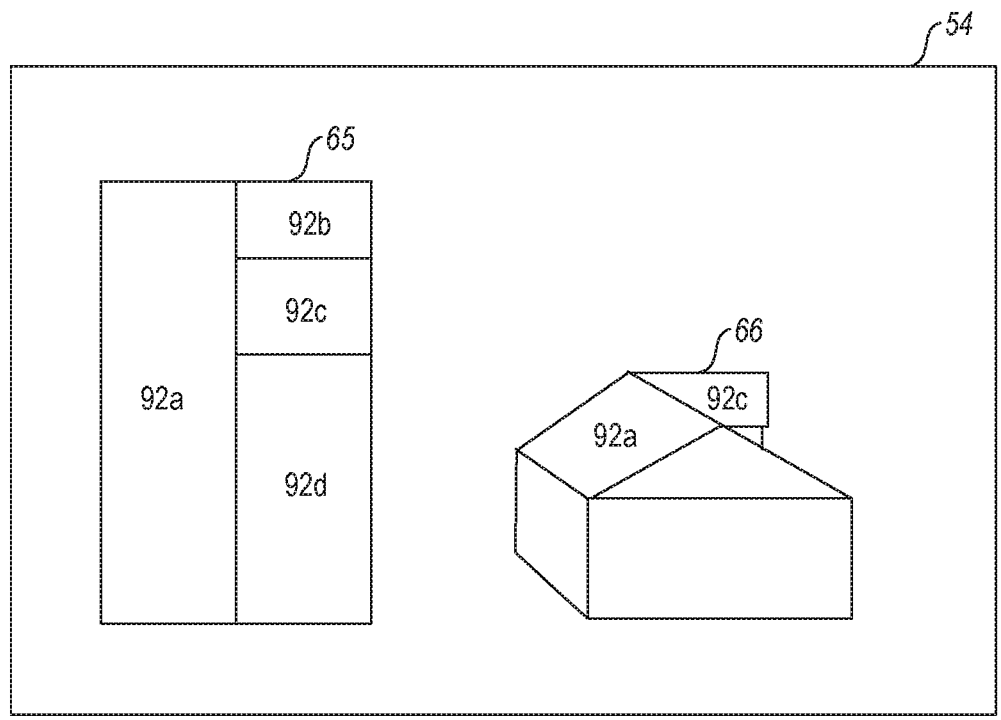
FIG. 9 is an illustration showing the top and perspective view of a house for a particular address.

Referring to the accompanying FIGS. 7-15, there is described a roof estimation system ("RES") 10 and method that allows a roof estimation service 70 to provide a final estimate 102-1 to a potential customer 90 to install equipment or to repair or replace the roof on a building 92 using aerial images of the building 92, as shown in FIG. 7. The roof estimation service 70 may be any service that provides roof estimates to customers. In one embodiment, the roof estimation service 70 typically provides roof estimates to customers who are roof companies or other entities involved in the construction and/or repair of roofs, such as builders, contractors, etc. In another embodiment, the roof estimation service 70 is a roof company that is directly involved in the construction and/or repair of roofs, and that provides estimates to customers that are property owners, general contractors, etc. The system 10 includes an estimating software program 50 designed to receive an address for the building 92. The software program 50 is linked to an aerial image file database 52 that contains aerial images files 54 of various building 92 in a region. The aerial image files 54 may be taken any available means, such as a manned or unmanned aircraft, a balloon, a satellite, etc. In some embodiments, the aerial image files may include images taken from a ground-based platform, such as a mobile ("street view") photography vehicle, a fixed position (e.g., a tower, nearby building, hilltop, etc.), etc. As shown in FIG. 9, the image files 54 typically include at least one a top plan view 65 and a perspective view 66 of the building 92. The roof of the building 92 includes multiple planar roof sections 92a-92d.

Figure 10:
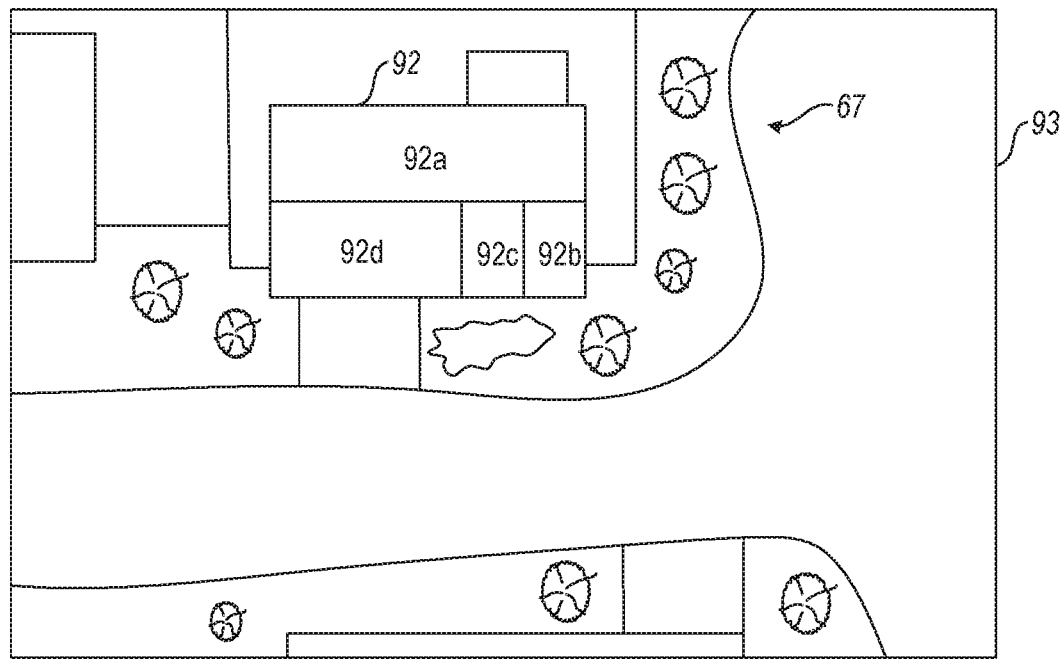
FIG. 10 is an aerial image of the home shown in FIG. 3 showing the areas and structures around the home.

As shown in FIG. 10, the image files 54 may also include a wide angle image 67 showing the building 92 and the surrounding areas 93 around the building 92.

Referring back to FIG. 7, in one embodiment, an image analysis and calibration module 56 is linked to the software program 50 that enables the roof estimation service 70 to closely estimate the dimensions and slopes of the roofs of the buildings 92 shown in the views 65, 66. By simply inputting the customer's address into the software program 50, the roof estimation service 70 is able view the customer's roof from the aerial image files 54 using a remote computer 72, determine the dimensions and slopes of the roof sections that make up the roof, and prepare a preliminary report 101 which is then used to prepare a final estimate 102-1 that is then delivered to the potential customer 90.

FIG. 7 is an illustration showing the system 10 used by a potential customer 90 requesting a roof estimate from a roof estimation service 70 that uses the system 10 described above. The potential customer 90 may be the building tenant, owner or insurance company. The roof estimation service 70 uses a computer 72 which may connect to a wide area network 60. The customer 90 contacts the roof estimation service 70 via his or her computer 91 and the wide area network 60 or by a telecommunication network 96, and requests a roof estimate 100-1 for his building 92 located at a public address 93. (in this example, "123 W. 3rd St."). The roof estimation service 70 then processes the request 100-1 which leads to a final estimate 102-1 being delivered to the potential customer's computer 91 or via email, fax or postal service to the potential customer 90.

There are several different ways the system 10 can be setup. FIG. 7 shows a first embodiment of the system 10 where the roof estimation service 70 operates a remote computer 72 with a display 74 and a keyboard 75 or similar input means, such as a mouse, joystick, track pad, etc. A roof estimating software program 50 is loaded into the working memory 73 of the remote computer 72. The software program 50 is able to retrieve aerial images of buildings from the database 52 containing aerial images files 54 of buildings located in the region served by the roof estimation service 70. In the first embodiment shown in FIG. 7, the remote computer 72 is linked or connected to a database 52 containing aerial images files 54 of the buildings. The software program 50 includes a calibration module 56 that enables the roof estimation service 70 to determine the angles and dimensions of various roof sections shown in the images files 54. After the angles and dimensions are determined, the combined square footage of the building 92 can be determined which is then used to create a preliminary report 101. The roof estimation service 70 then reviews the wide angle image file 67 (see FIG. 10) to determine if the building 92 has special access and clean up factors that may impact the final estimate 102-1. Once the preliminary report 101 or the final estimate 102-1 is prepared by the roof estimation service 70, one or both can be transmitted to the customer 90 via the wide area network 60, the telecommunication network 96, or by postal service.

Also shown in FIG. 7 is an alternative setup of the system 10 wherein a preliminary report 101 is prepared by a separate roof estimating entity 105 which is then forwarded to the roof estimation service 70 who then prepares the final estimate 102-1 and sends it to the customer 90. The entity 105 includes a computer 106-1 with a roof estimating software program 50' loaded into the working memory 107. Like the software program 50 loaded into the roof contractor's computer 72 in the previous embodiment the software program 50' is also able to retrieve aerial images of houses from a database 52' containing aerial images files 54' of houses located in the region served by the roof estimation service 70. An optional calibration module 56' may be provided which enables the entity 105 to determine the angles and linear dimensions of various roof sections on the house 92.

When the system 10 is set up to include the estimating entity 105, the customer 90 may first contact the roof estimation service 70. The roof estimation service 70 may then contact the estimating entity 105 and forward the address of the building 92 thereto. The estimating entity 105 may then prepare the preliminary report 101 that is transmitted to the roof estimation service 70. The roof estimation service 70 may then prepare the final report 102-1 and send it to the customer 90. In other embodiments, interactions between the customer 90, the roof estimation service 70, and the estimating entity 105 may occur in different ways and/or orders. For example, the customer 90 may contact the estimating entity 105 directly to receive a final report 102-1, which the customer 90 may then forward to one or more roof companies of their choosing.

FIG. 8 shows a third embodiment of the system 10 where the customer 90 contacts a roof estimating entity 130-1 who receives a request 100-1 from the customer 90 via the wide area network 60 or telecommunication network 96. The roof estimating entity 130-1 prepares a preliminary report 101 which is then transmitted to various roof estimation services 70, 70', 70" associated with the entity 130. Accompanying the preliminary report 101 may be the name and contact telephone number(s) or email address of the customer 90. Each roof estimation service 70, 70', 70" reviews the preliminary report 101 and any associated images sent therewith and then prepares a final estimate 102-1, 102-1', 102-1". The final estimate 102-1, 102-1', 102-1' is then mailed, emailed or faxed to the customer 90 or back to the estimating entity 130-1. The estimating entity 130-1 then sends the final estimate 102-1, 102-1', 102-1' to the customer 90. In this embodiment, the estimating entity 130-1 includes a computer 135 in which the roof estimating software program 50" is loaded into its working memory 136 loaded and linked to the aerial image database 52" containing image files 54". An optional calibration module 56" may be loaded into the working memory 136 of the computer 135.

Figure 11A:
FIGS. 11A-11F are consecutive pages from a preliminary or final report sent to a potential customer prepared by the roofing company.
Figure 11B:
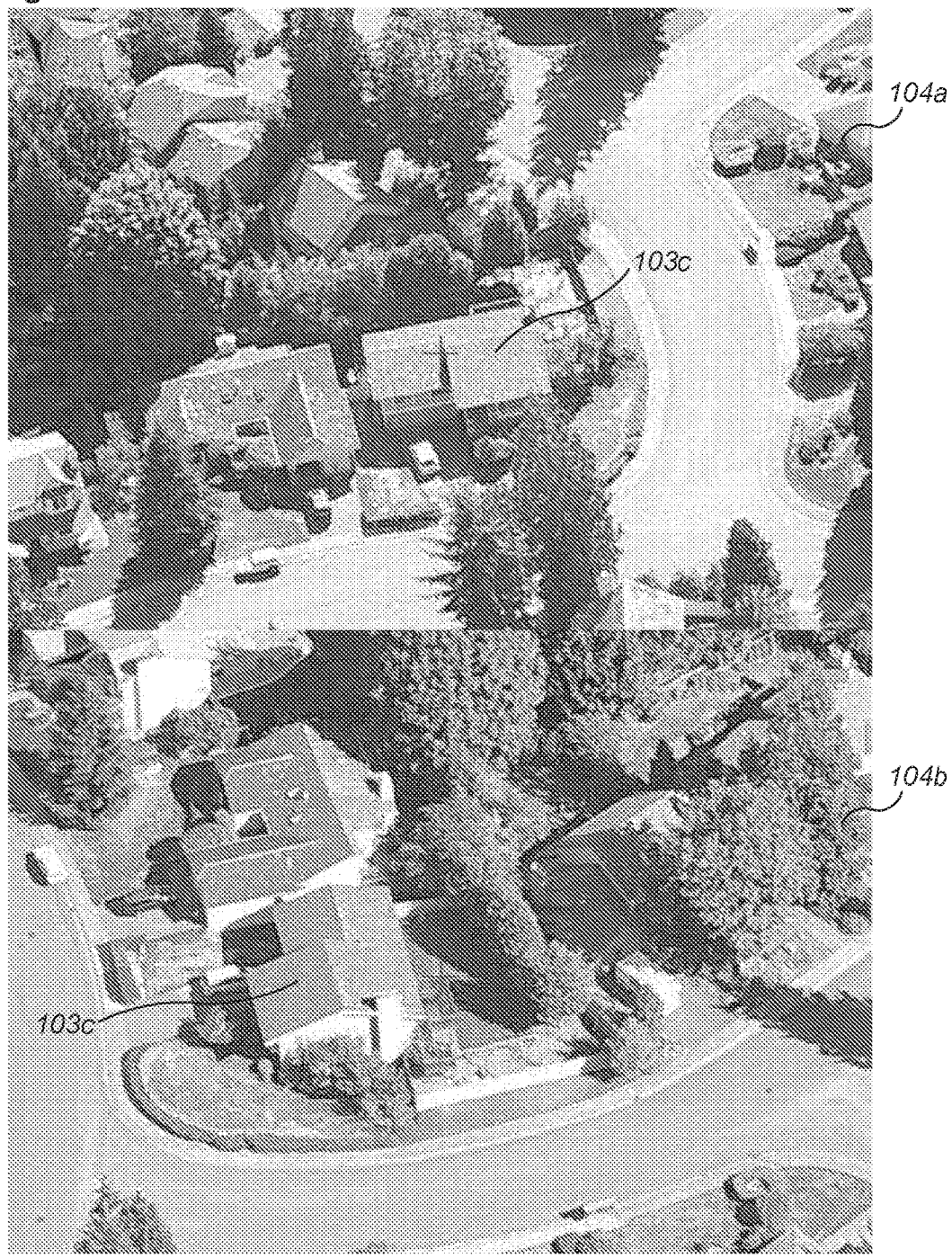
Figure 11C:
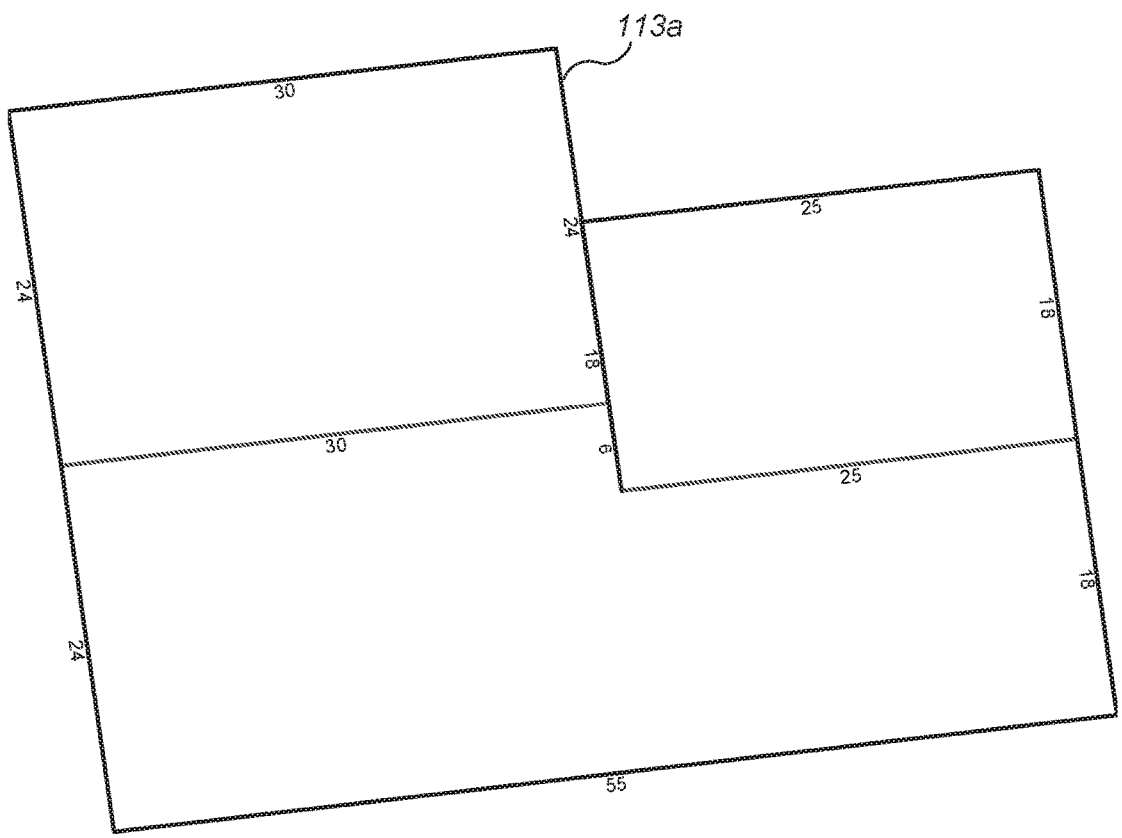
Figure 11D:
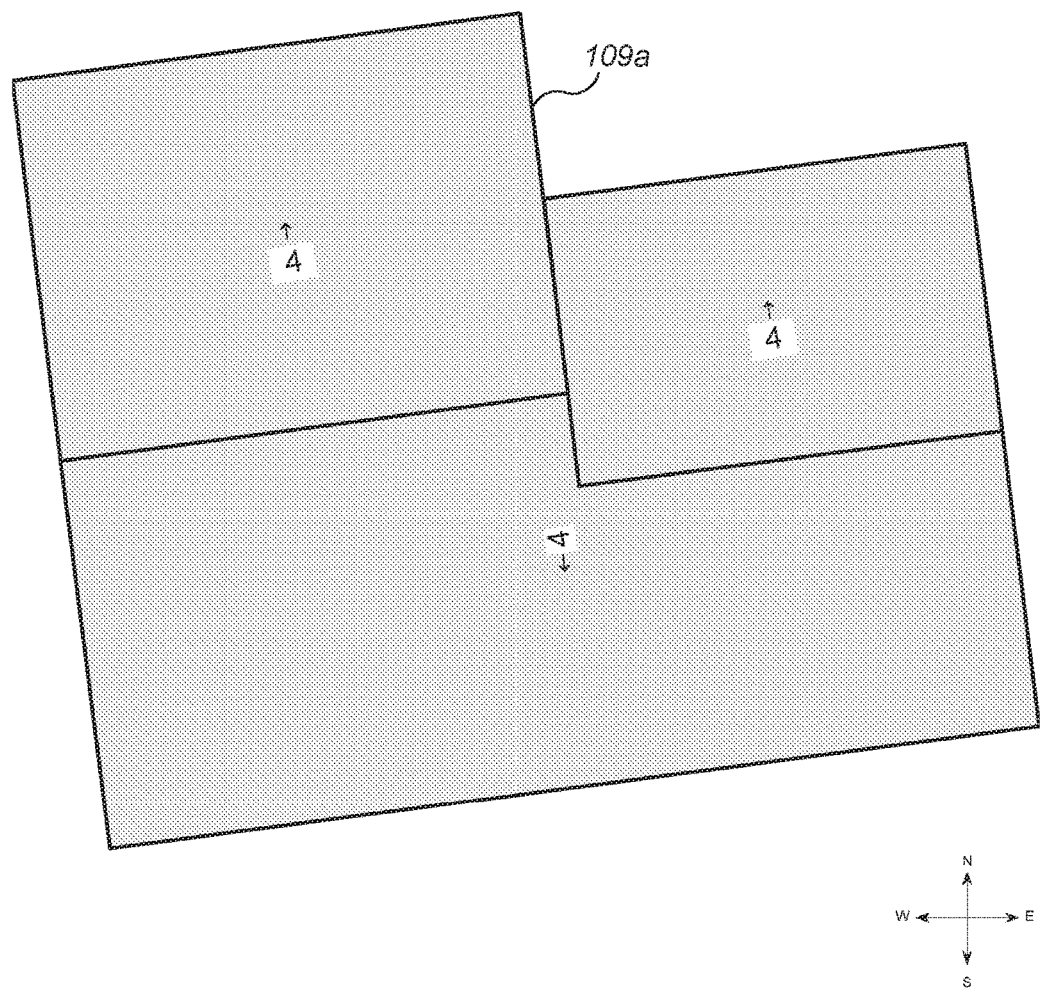
Figure 11E:
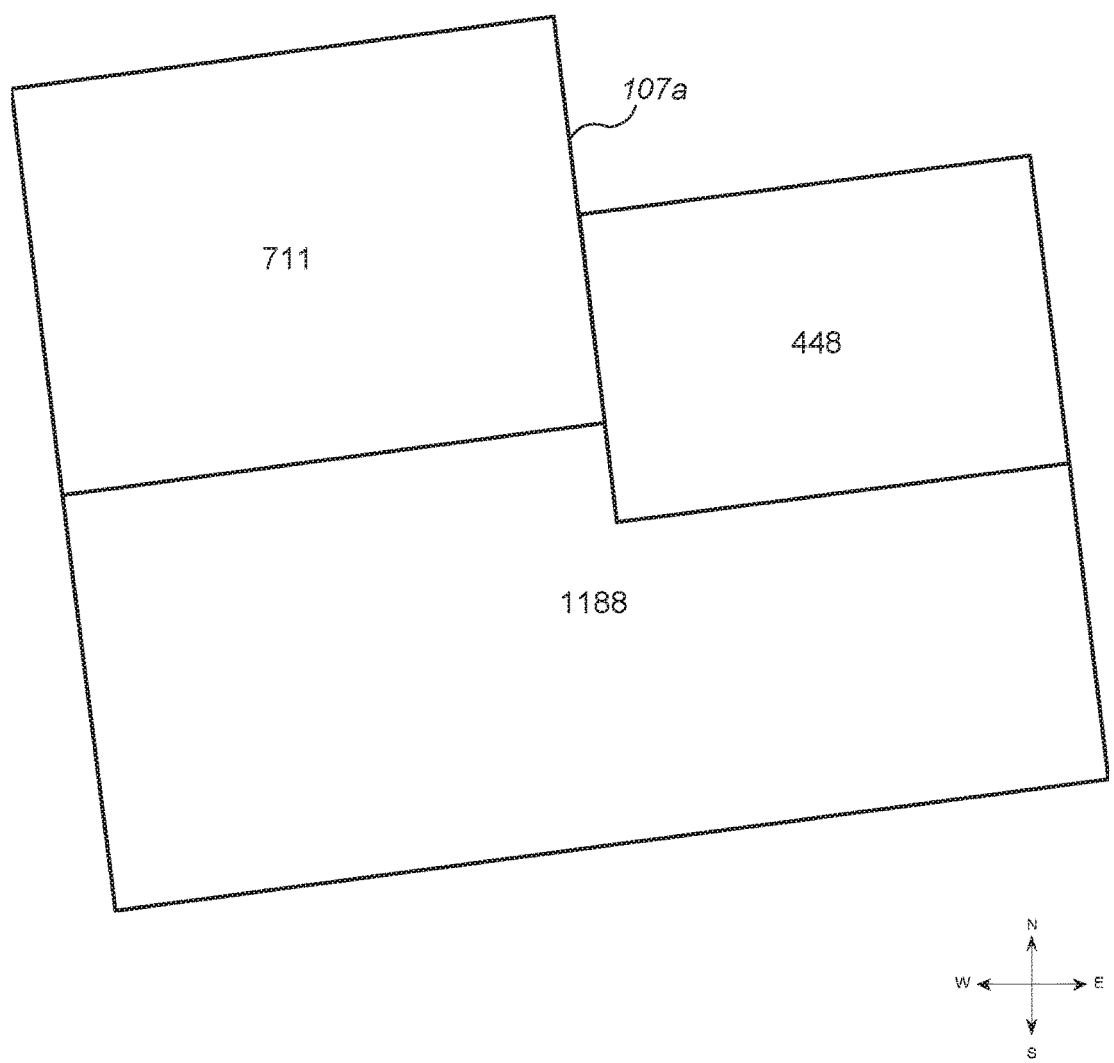
Figure 11F:
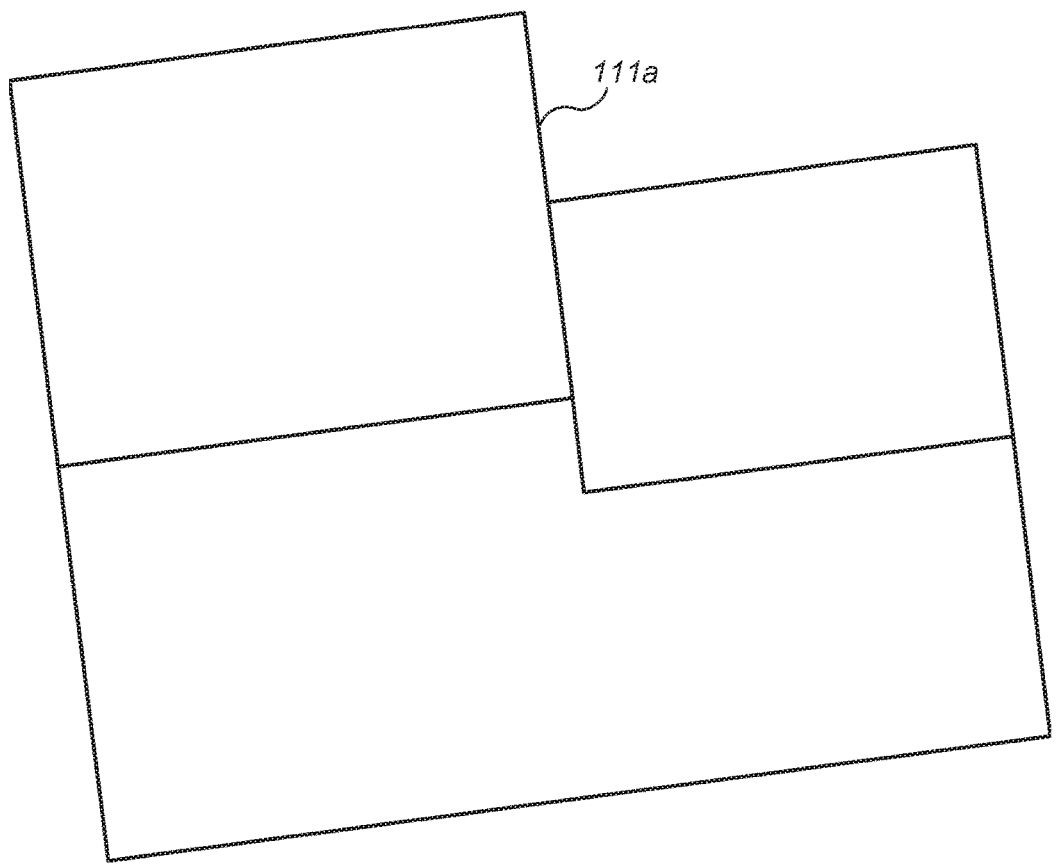

FIGS. 11A-11F are individual pages that make up a representative report. In FIG. 11A, a cover page 103 that lists the address 103a of a building 103c and an overhead aerial image 103b of the building 103c. In FIG. 11B, a second page 104-1 of the report is shown that shows two wide overhead perspective views 104a and 104b of the building 103c at the address with the surrounding areas more clearly shown. FIG. 11C is the third page 113 of the report which shows a line drawing 113a of the building showing ridge and valley lines, dimensions and a compass indicator. FIG. 11D is an illustration of the fourth page 109 of the report showing a line drawing 109a of the building showing the pitch of each roof section along with a compass indicator. The pitch in this example is given in inches, and it represents the number of vertical inches that the labeled planar roof section drops over 12 inches of horizontal run. The slope can be easily calculated from such a representation using basic trigonometry. The use of a numerical value of inches of rise per foot of run is a well known measure of slope in the roofing industry. A roof builder typically uses this information to assist in the repair and/or construction of a roof. Of course, other measures and/or units of slope may be utilized as well, including percent grade, angle in degrees, etc. FIG. 11E is an illustration of the fifth page 107 of the report showing a line drawing 107a of the building showing the square footage of each roof section along with the total square foot area value. FIG. 11F is an illustration of a sixth page 111 of the report showing a line drawing 111a of the building where notes or comments may be written.

Using the above roof estimation system, a detailed description of how the system may be used in one example embodiment is now provided.

First, a property of interest is identified by a potential customer of the roof estimation service 70. The customer may be a property owner, a roof construction/repair company, a contractor, an insurance company, a solar panel installer, etc. The customer contacts the roof estimation service with the location of the property. Typically, this will be a street address. The roof estimation service 70 may then use a geo-coding provider, operated by the service 70 or some third party, to translate the location information (such as a street address) into a set of coordinates that can be used to query an aerial or satellite image database. Typically, the geo-coding provider will be used to translate the customer supplied street address into a set of longitude-latitude coordinates.

Next, the longitude-latitude coordinates of the property may be used to query an aerial and/or satellite imagery database in order to retrieve one or more images of the property of interest. It is important to note that horizontal (non-sloping) flat roofs only require a single image of the property. However, few roofs (especially those on residential buildings) are horizontally flat, and often contain one or more pitched sections. In such cases, two or more photographs are typically used in order for the service 70 to identify and measure all relevant sections and features of the roof.

Once the images of the roof section of the building are obtained, at least one of the images may be calibrated. During calibration, the distance in pixels between two points on the image is converted into a physical length. This calibration information is typically presented as a scale marker on the image itself, or as additional information supplied by the image database provider along with the requested image.

The image(s) and calibration information returned by the imagery database is entered or imported into measurement software of the service 70.

Next, a set of reference points may be identified in each of the images. The service's 70 measurement software then uses these reference points and any acceptable algorithm to co-register the images and reconstruct the three-dimensional geometry of the object identified by the reference points. There are a variety of photo-grammetric algorithms that can be utilized to perform this reconstruction. One such algorithm used by the service 70 uses photographs taken from two or more view points to "triangulate" points of interest on the object in three-dimensional ("3D") space. This triangulation can be visualized as a process of projecting a line originating from the location of the photograph's observation point that passes through a particular reference point in the image. The intersection of these projected lines from the set of observation points to a particular reference point identifies the location of that point in 3D space. Repeating the process for all such reference points allows the software to build a 3D model of the structure.

The optimal choice of reconstruction algorithm depends on a number of factors such as the spatial relationships between the photographs, the number and locations of the reference points, and any assumptions that are made about the geometry and symmetry of the object being reconstructed. Several such algorithms are described in detail in textbooks, trade journals, and academic publications.

Once the reconstruction of the building is complete, the results may be reviewed for completeness and correctness. If necessary, an operator of the service's 70 software will make corrections to the reconstructed model.

Information from the reconstructed model may then be used to generate a report containing information relevant to the customer. The information in the report may include total square footage, square footage and pitch of each section of roof, linear measurements of all roof segments, identification and measurement of ridges and valleys, and different elevation views rendered from the 3D model (top, side, front, etc).

Using the above description, a method for estimating the size and the repair or replacement costs of a roof may include the following steps:

a. selecting a roof estimation system that includes a computer with a roof estimation software program loaded into its working memory, said roof estimation software uses aerial image files of buildings in a selected region and a calibration module that allows the size, geometry, and orientation of a roof section to be determined from said aerial image files;

b. submitting a request for a measurement of a roof of a building at a known location;

c. submitting the location information of a building with a roof that needs a size determination, a repair estimate, or replacement estimate;

d. entering the location information of said building and obtaining aerial image files of one or more roof sections used on a roof; and, e. using said calibration module to determine the size, geometry and pitch of each said roof section.

In the above method, the entity requesting the measurement may be a roof construction/repair company, the building tenant, the building owner, an insurance company, etc.

Figure 12:
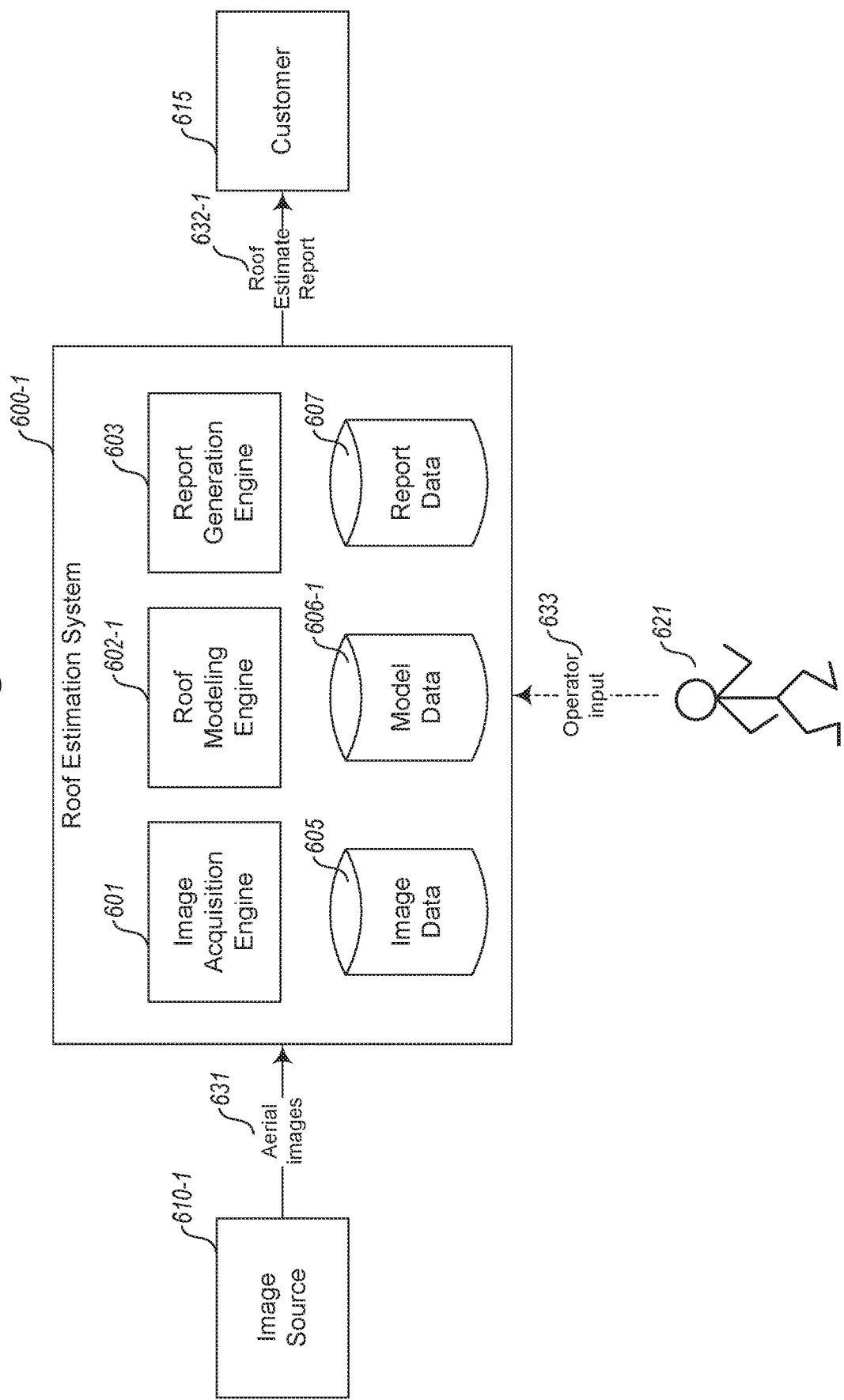
FIG. 12 is a block diagram illustrating example functional elements of one embodiment of a roof estimation system.

FIG. 12 is a block diagram illustrating example functional elements of one embodiment of a roof estimation system. In particular, FIG. 12 shows an example Roof Estimation System ("RES") 600-1 comprising an image acquisition engine 601, a roof modeling engine 602-1, a report generation engine 603, image data 605, model data 606-1, and report data 607. The RES 600-1 is communicatively coupled to an image source 610-1, a customer 615, and optionally an operator 621. The RES 600-1 and its components may be implemented as part of a computing system, as will be further described with reference to FIG. 13.

In the illustrated embodiment, the RES 600-1 performs some or all of the functions of the whole system described with reference to FIGS. 7 and 8, and also additional functions as described below. For example, the RES 600-1 may perform one or more of the functions of the software program 50, the roof estimating entity 105, the aerial image file database 52, and/or the calibration module 56.

More specifically, in the illustrated embodiment of FIG. 12, the RES 600-1 is configured to generate a roof estimate report 632-1 for a specified building, based on aerial images 631 of the building received from the image source 610-1. The image source 610-1 may be any provider of images of the building for which a roof estimate is being generated. In one embodiment, the image source 610-1 includes a computing system that provides access to a repository of aerial images of one or more buildings. The image acquisition engine 601 obtains one or more aerial images of the specified building by, for example, providing an indicator of the location of the specified building (e.g., street address, GPS coordinates, lot number, etc.) to the image source 610-1. In response, the image source 610-1 provides to the image acquisition engine 601 the one or more aerial images of the building. The image acquisition engine 601 then stores the received aerial images as image data 605, for further processing by other components of the RES 600-1. In some embodiments, the aerial images may include images obtain via one or more ground-based platforms, such as a vehicle-mounted camera that obtains street-level images of buildings, a nearby building, a hilltop, etc. In some cases, a vehicle-mounted camera may be mounted in an elevated position, such as a boom.

Next, the roof modeling engine 602-1 generates a model of the roof of the specified building. In the illustrated embodiment, the roof modeling engine 602-1 generates a three-dimensional model, although in other embodiments, a two-dimensional (e.g., top-down roof plan) may be generated instead or in addition. As noted above, a variety of automatic and semi-automatic techniques may be employed to generate a model of the roof of the building. In one embodiment, generating such a model is based at least in part on a correlation between at least two of the aerial images of the building. For example, the roof modeling engine 602-1 receives an indication of a corresponding feature that is shown in each of the two aerial images. In one embodiment, an operator 621, viewing two or more images of the building, inputs an indication in at least some of the images, the indications identifying which points of the images correspond to each other for model generation purposes.

The corresponding feature may be, for example, a vertex of the roof of the building, the corner of one of the roof planes of the roof, a point of a gable or hip of the roof, etc. The corresponding feature may also be a linear feature, such as a ridge or valley line between two roof planes of the roof. In one embodiment, the indication of a corresponding feature on the building includes "registration" of a first point in a first aerial image, and a second point in a second aerial image, the first and second points corresponding the substantially the same point on the roof of the building. Generally, point registration may include the identification of any feature shown in both aerial images. Thus, the feature need not be a point on the roof of the building. Instead, it may be, for example, any point that is visible on both aerial images, such as on a nearby building (e.g., a garage, neighbor's building, etc.), on a nearby structure (e.g., swimming pool, tennis court, etc.), on a nearby natural feature (e.g., a tree, boulder, etc.), etc.

In some embodiments, the roof modeling engine 602-1 determines the corresponding feature automatically, such as by employing on one or more image processing techniques used to identify vertexes, edges, or other features of the roof. In other embodiments, the roof modeling engine 602-1 determines the corresponding feature by receiving, from the human operator 621 as operator input 633, indications of the feature shown in multiple images of the building.

In addition, generating a 3D model of the roof of a building may include correcting one or more of the aerial images for various imperfections. For example, the vertical axis of a particular aerial image sometimes will not substantially match the actual vertical axis of its scene. This will happen, for example, if the aerial images were taken at different distances from the building, or at a different pitch, roll, or yaw angles of the aircraft from which the images were produced. In such cases, an aerial image may be corrected by providing the operator 621 with a user interface control operable to adjust the scale and/or relative angle of the aerial image to correct for such errors. The correction may be either applied directly to the aerial image, or instead be stored (e.g., as an offset) for use in model generation or other functions of the RES 600-1.

Generating a 3D model of the roof of a building further includes the automatic or semi-automatic identification of features of the roof of the building. In one embodiment, one or more user interface controls may be provided, such that the operator 621 may indicate (e.g., draw, paint, etc.) various features of the roof, such as valleys, ridges, hips, vertexes, planes, edges, etc. As these features are indicated by the operator 621, a corresponding 3D model may be updated accordingly to include those features. These features are identified by the operator based on a visual inspection of the images and by providing inputs that identify various features as valleys, ridges, hips, etc. In some cases, a first and a second image view of the roof (e.g., a north and east view) are simultaneously presented to the operator 621, such that when the operator 621 indicates a feature in the first image view, a projection of that feature is automatically presented in the second image view. By presenting a view of the 3D model, simultaneously projected into multiple image views, the operator 621 is provided with useful visual cues as to the correctness of the 3D model and/or the correspondence between the aerial images.

In addition, generating a 3D model of the roof of a building may include determining the pitch of one or more of the sections of the roof. In some embodiments, one or more user interface controls are provided, such that the operator 621 may accurately determine the pitch of each of the one or more roof sections. An accurate determination of the roof pitch may be employed (by a human or the RES 600-1) to better determine an accurate cost estimate, as roof sections having a low pitch are typically less costly surfaces to repair and/or replace.

The generated 3D model typically includes a plurality of planar roof sections that each correspond to one of the planar sections of the roof of the building. Each of the planar roof sections in the model has a number of associated dimensions and/or attributes, among them slope, area, and length of each edge of the roof section. Other information may include, whether a roof section edge is in a valley or on a ridge of the roof, the orientation of the roof section, and other information relevant to roof builder (e.g., roof and/or roof section perimeter dimensions and/or outlines). Once a 3D model has been generated to the satisfaction of the roof modeling engine 602-1 and/or the operator 621, the generated 3D model is stored as model data 606-1 for further processing by the RES 600-1. In one embodiment, the generated 3D model is then stored in a quality assurance queue, from which it is reviewed and possibly corrected by a quality control operator.

The report generation engine 603 generates a final roof estimate report based on a 3D model stored as model data 606-1, and then stores the generated report as report data 607. Such a report typically includes one or more plan (top-down) views of the 3D model, annotated with numerical values for the slope, area, and/or lengths of the edges of at least some of the plurality of planar roof sections of the 3D model of the roof. For example, the example report of FIGS. 11A-11E includes multiple plan views of a generated 3D model of the house 103c. In particular, FIG. 11C shows a first plan view of the 3D model, annotated with dimensions of the edges of each roof section. FIG. 11D shows a second plan view of the same 3D model, annotated with the slope of each roof section. FIG. 11E shows a third plan view of the same 3D model, annotated with the area of each roof section.

In some embodiments, generating a report includes labeling one or more views of the 3D model with annotations that are readable to a human user. Some 3D models include a large number of small roof details, such as dormers or other sections, such that applying uniformly sized, oriented, and positioned labels to roof section views results in a visually cluttered diagram. Accordingly, various techniques may be employed to generate a readable report, including automatically determining an optimal or near-optimal label font size, label position, and/or label orientation, such that the resulting report may be easily read and understood by the customer 615.

In addition, in some embodiments, generating a report includes automatically determining a cost estimate, based on specified costs, such as those of materials, labor, transportation, etc. For example, the customer 615 provides indications of material and labor costs to the RES 600-1. In response, the report generation engine 603 generates a roof estimate report that includes a cost estimate, based on the costs provided by the customer 615 and the attributes of the particular roof, such as area, pitch, etc.

In one embodiment, the generated report is then provided to a customer. The generated report can be represented, for example, as an electronic file (e.g., a PDF file) or a paper document. In the illustrated example, roof estimate report 632-1 is transmitted to the customer 615. The customer 615 may be or include any human, organization, or computing system that is the recipient of the roof estimate report 632-1. The customer 615 may be a property owner, a property manager, a roof construction/repair company, a general contractor, an insurance company, a solar power panel installer, etc. Reports may be transmitted electronically, such as via a network (e.g., as an email, Web page, etc.) or by some shipping mechanism, such as the postal service, a courier service, etc.

In some embodiments, one or more of the 3D models stored as model data 606-1 are provided directly to the customer, without first being transformed into a report. For example, a 3D model may be exported as a data file, in any acceptable format, that may be consumed or otherwise utilized by some other computing system, such as computer-aided design ("CAD") tool, drawing program, etc.

Figure 13:
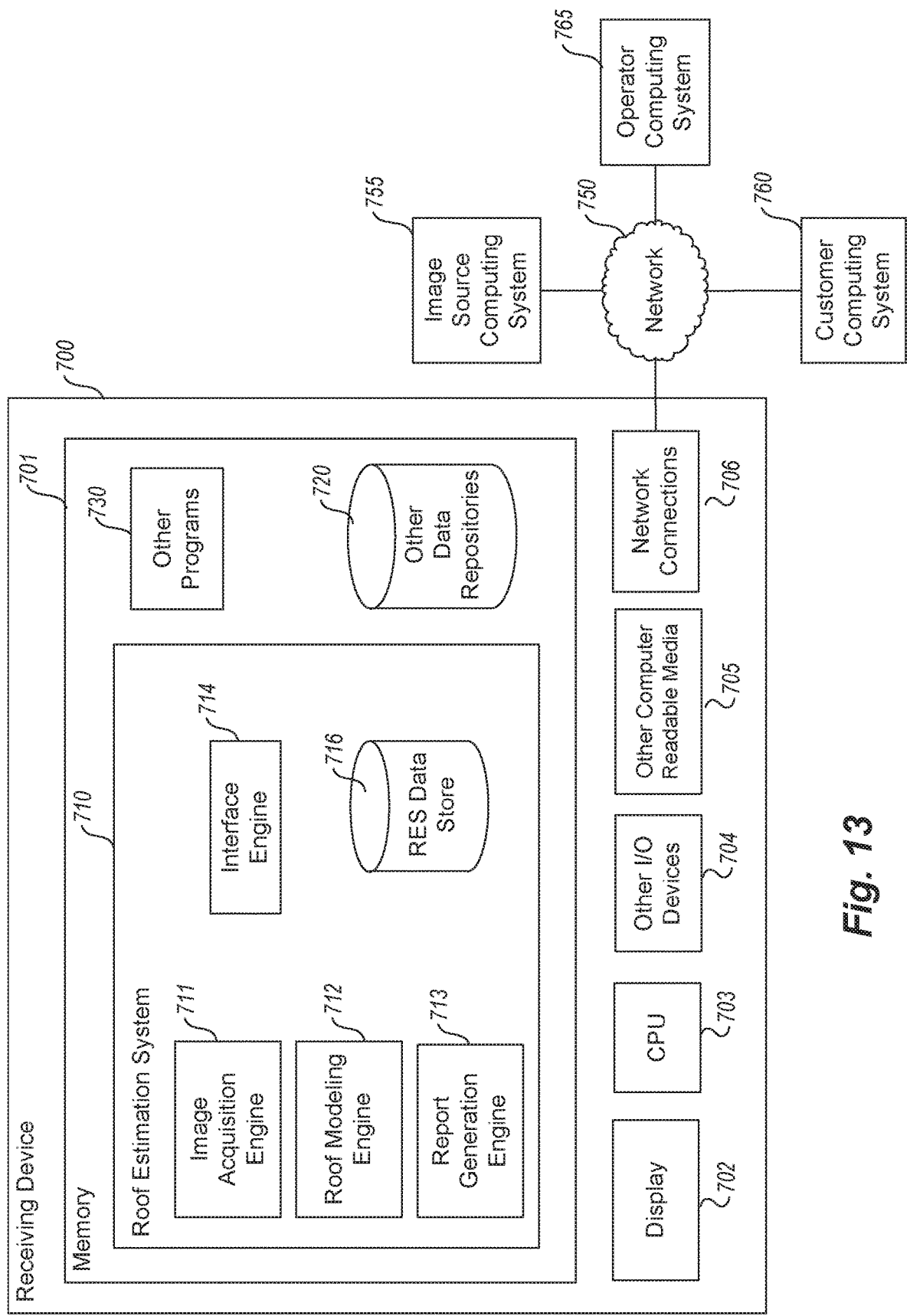
FIG. 13 is an example block diagram of a computing system for practicing embodiments of a roof estimation system.

FIG. 13 is an example block diagram of a computing system for practicing embodiments of a roof estimation system. FIG. 13 shows a computing system 700 that may be utilized to implement a Roof Estimation System ("RES") 710. One or more general purpose or special purpose computing systems may be used to implement the RES 710. More specifically, the computing system 700 may comprise one or more distinct computing systems present at distributed locations. In addition, each block shown may represent one or more such blocks as appropriate to a specific embodiment or may be combined with other blocks. Moreover, the various blocks of the RES 710 may physically reside on one or more machines, which use standard inter-process communication mechanisms (e.g., TCP/IP) to communicate with each other. Further, the RES 710 may be implemented in software, hardware, firmware, or in some combination to achieve the capabilities described herein.

In the embodiment shown, computing system 700 comprises a computer memory ("memory") 701, a display 702, one or more Central Processing Units ("CPU") 703, Input/Output devices 704 (e.g., keyboard, mouse, CRT or LCD display, and the like), other computer-readable media 705, and network connections 706. The RES 710 is shown residing in memory 701. In other embodiments, some portion of the contents, some of, or all of the components of the RES 710 may be stored on and/or transmitted over the other computer-readable media 705. The components of the RES 710 preferably execute on one or more CPUs 703 and generate roof estimate reports, as described herein. Other code or programs 730 (e.g., a Web server, a database management system, and the like) and potentially other data repositories, such as data repository 720, also reside in the memory 701, and preferably execute on one or more CPUs 703. Not all of the components in FIG. 13 are required for each implementation. For example, some embodiments embedded in other software do not provide means for user input, for display, for a customer computing system, or other components.

In a typical embodiment, the RES 710 includes an image acquisition engine 711, a roof modeling engine 712, a report generation engine 713, an interface engine 714, and a roof estimation system data repository 716. Other and/or different modules may be implemented. In addition, the RES 710 interacts via a network 750 with an image source computing system 755, an operator computing system 765, and/or a customer computing system 760.

The image acquisition engine 711 performs at least some of the functions of the image acquisition engine 601 described with reference to FIG. 12. In particular, the image acquisition engine 711 interacts with the image source computing system 755 to obtain one or more images of a building, and stores those images in the RES data repository 716 for processing by other components of the RES 710. In some embodiments, the image acquisition engine 711 may act as an image cache manager, such that it preferentially provides images to other components of the RES 710 from the RES data repository 716, while obtaining images from the image source computing system 755 when they are not already present in the RES data repository 716.

The roof modeling engine 712 performs at least some of the functions of the roof modeling engine 602-1 described with reference to FIG. 12. In particular, the roof modeling engine 712 generates a 3D model based on one or more images of a building that are obtained from the RES data repository 716. As noted, 3D model generation may be performed semi-automatically, based on at least some inputs received from the computing system 765. In addition, at least some aspects of the 3D model generation may be performed automatically, based on image processing and/or image understanding techniques. After the roof modeling engine 712 generates a 3D model, it stores the generated model in the RES data repository 716 for further processing by other components of the RES 710.

The report generation engine 713 performs at least some of the functions of the report generation engine 603 described with reference to FIG. 6. In particular, the report generation engine 713 generates roof reports based on 3D models stored in the RES data repository 716. Generating a roof report may include preparing one or more views of a given 3D model of a roof, annotating those views with indications of various characteristics of the model, such as dimensions of sections or other features (e.g., ridges, valleys, etc.) of the roof, slopes of sections of the roof, areas of sections of the roof, etc.

The interface engine 714 provides a view and a controller that facilitate user interaction with the RES 710 and its various components. For example, the interface engine 714 provides an interactive graphical user interface that can be used by a human user operating the operator computing system 765 to interact with, for example, the roof modeling engine 602-1, to perform functions related to the generation of 3D models, such as point registration, feature indication, pitch estimation, etc. In other embodiments, the interface engine 714 provides access directly to a customer operating the customer computing system 760, such that the customer may place an order for a roof estimate report for an indicated building location. In at least some embodiments, access to the functionality of the interface engine 714 is provided via a Web server, possibly executing as one of the other programs 730.

In some embodiments, the interface engine 714 provides programmatic access to one or more functions of the RES 710. For example, the interface engine 714 provides a programmatic interface (e.g., as a Web service, static or dynamic library, etc.) to one or more roof estimation functions of the RES 710 that may be invoked by one of the other programs 730 or some other module. In this manner, the interface engine 714 facilitates the development of third-party software, such as user interfaces, plug-ins, adapters (e.g., for integrating functions of the RES 710 into desktop applications, Web-based applications, embedded applications, etc.), and the like. In addition, the interface engine 714 may be in at least some embodiments invoked or otherwise accessed via remote entities, such as the operator computing system 765, the image source computing system 755, and/or the customer computing system 760, to access various roof estimation functionality of the RES 710.

The RES data repository 716 stores information related the roof estimation functions performed by the RES 710. Such information may include image data 605, model data 606-1, and/or report data 607 described with reference to FIG. 6. In addition, the RES data repository 716 may include information about customers, operators, or other individuals or entities associated with the RES 710.

In an example embodiment, components/modules of the RES 710 are implemented using standard programming techniques. For example, the RES 710 may be implemented as a "native" executable running on the CPU 703, along with one or more static or dynamic libraries. In other embodiments, the RES 710 is implemented as instructions processed by virtual machine that executes as one of the other programs 730. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments execute concurrently and asynchronously, and communicate using message passing techniques. Equivalent synchronous embodiments are also supported by an RES implementation. Also, other functions could be implemented and/or performed by each component/module, and in different orders, and by different components/modules, yet still achieve the functions of the RES.

In addition, programming interfaces to the data stored as part of the RES 710, such as in the RES data repository 716, can be available by standard mechanisms such as through C, C++, C#, and Java APIs; libraries for accessing files, databases, or other data repositories; through scripting languages such as XML; or through Web servers, FTP servers, or other types of servers providing access to stored data. For example, the RES data repository 716 may be implemented as one or more database systems, file systems, memory buffers, or any other technique for storing such information, or any combination of the above, including implementations using distributed computing techniques.

Also, the example RES 710 can be implemented in a distributed environment comprising multiple, even heterogeneous, computer systems and networks. For example, in one embodiment, the image acquisition engine 711, the roof modeling engine 712, the report generation engine 713, the interface engine 714, and the data repository 716 are all located in physically different computer systems. In another embodiment, various modules of the RES 710 are hosted each on a separate server machine and are remotely located from the tables which are stored in the data repository 716. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like).

Furthermore, in some embodiments, some or all of the components of the RES are implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 14:
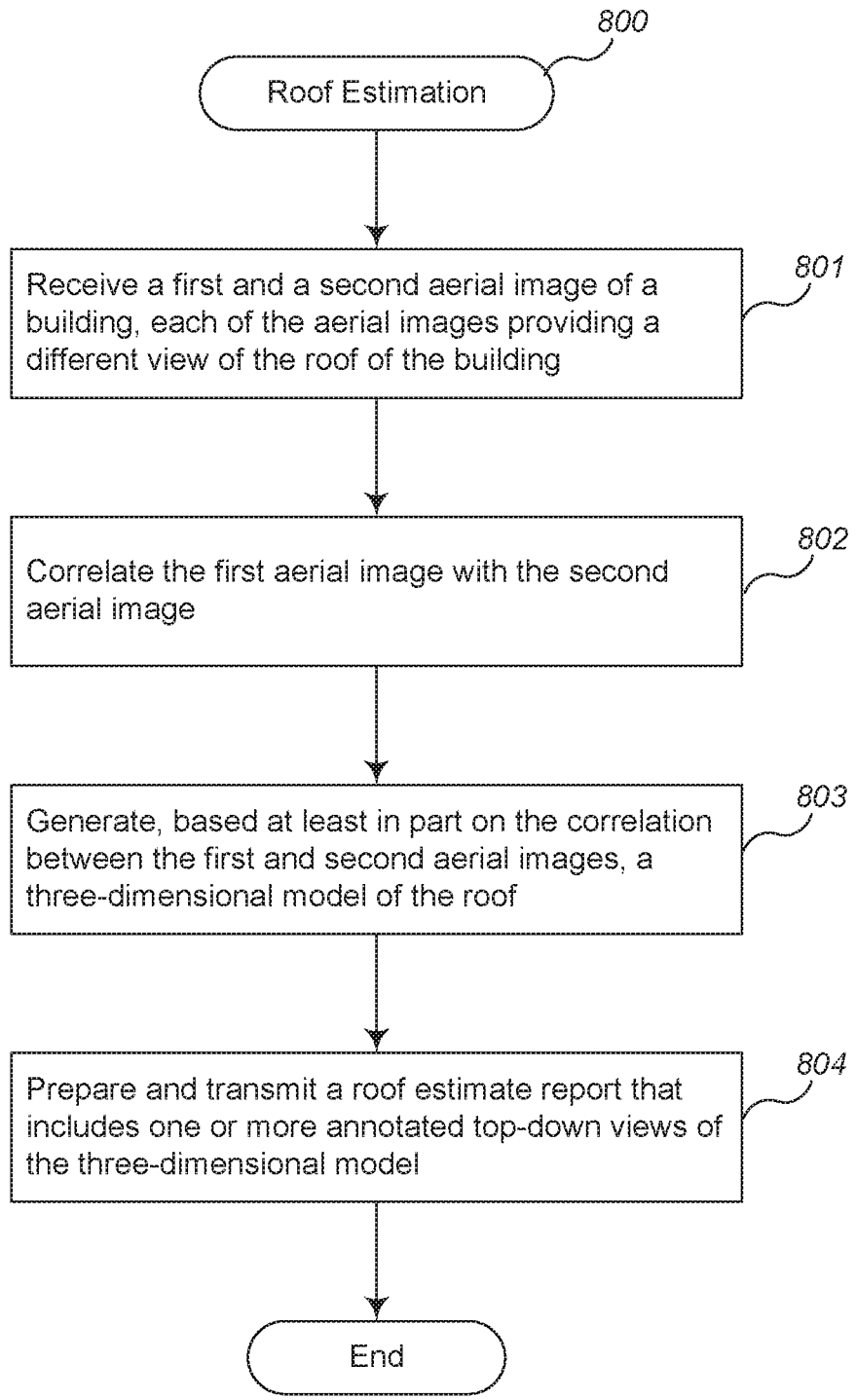
FIG. 14 is an example flow diagram of a first example roof estimation routine provided by an example embodiment.

FIG. 14 is an example flow diagram of a first example roof estimation routine provided by an example embodiment.

The illustrated routine 800 may be provided by, for example, execution of the roof estimation system 710 described with respect to FIG. 13. The illustrated routine 800 generates a 3D model of a roof of a building, based on two or more aerial images of the building, and further prepares and transmits a roof estimate report based on the 3D model.

More specifically, the routine begins at step 801 where it receives a first and a second aerial image of a building, each of the aerial images providing a different view of the roof of the building. The aerial images may be received from, for example, the image source computing system 755 and/or from the RES data repository 716 described with reference to FIG. 13. As discussed above, aerial images may be originally created by cameras mounted on airplanes, balloons, satellites, etc. In some embodiments, images obtained from ground-based platforms (e.g., vehicle-mounted cameras) may be used instead or in addition.

In step 802, the routine correlates the first aerial image with the second aerial image. In some embodiments, correlating the aerial images may include registering pairs of points on the first and second aerial images, each pair of points corresponding to substantially the same point on the roof depicted in each of the images. Correlating the aerial images may be based at least in part on input received from a human operator and/or automatic image processing techniques.

In step 803, the routine generates, based at least in part on the correlation between the first and second aerial images, a three-dimensional model of the roof. The three-dimensional model of the roof may include a plurality of planar roof sections that each have a corresponding slope, area, and perimeter. Generating the three-dimensional model may be based at least in part indications of features of the roof, such as valleys, ridges, edges, planes, etc. Generating the three-dimensional model may also be based at least in part on input received from a human operator (e.g., indications of roof ridges and valleys) and/or automatic image processing techniques.

In step 804, the routine prepares (e.g., generates, determines, produces, etc.) and transmits a roof estimate report that includes one or more annotated top-down views of the three-dimensional model. In some embodiments, the annotations include numerical values indicating the slope, area, and lengths of the edges of the perimeter of at least some of the plurality of planar roof sections of the three-dimensional model of the roof. The roof estimate report may be an electronic file that includes images of the building and/or its roof, as well as line drawings of one or more views of the three-dimensional model of the building roof. Preparing the report may include annotating the report with labels that are sized and oriented in a manner that preserves and/or enhances readability of the report. For example, labels on a particular line drawing may be sized based at least in part on the size of the feature (e.g., roof ridge line) that they are associated with, such that smaller features are annotated with smaller labels so as to preserve readability of the line drawing by preventing or reducing the occurrence of labels that overlap with other portions (e.g., lines, labels, etc.) of the line drawing. The roof estimate report may be transmitted to various destinations, such as directly to a customer or computing system associated with that customer, a data repository, and/or a quality assurance queue for inspection and/or improvement by a human operator.

After step 804, the routine ends. In other embodiments, the routine may instead return to step 801, to generate another roof estimate report for another building. Note that the illustrated routine may be performed interactively, such as based at least in part on one or more inputs received from a human operator, or in batch mode, such as for performing automatic, bulk generation of roof estimate reports.

Figure 15:
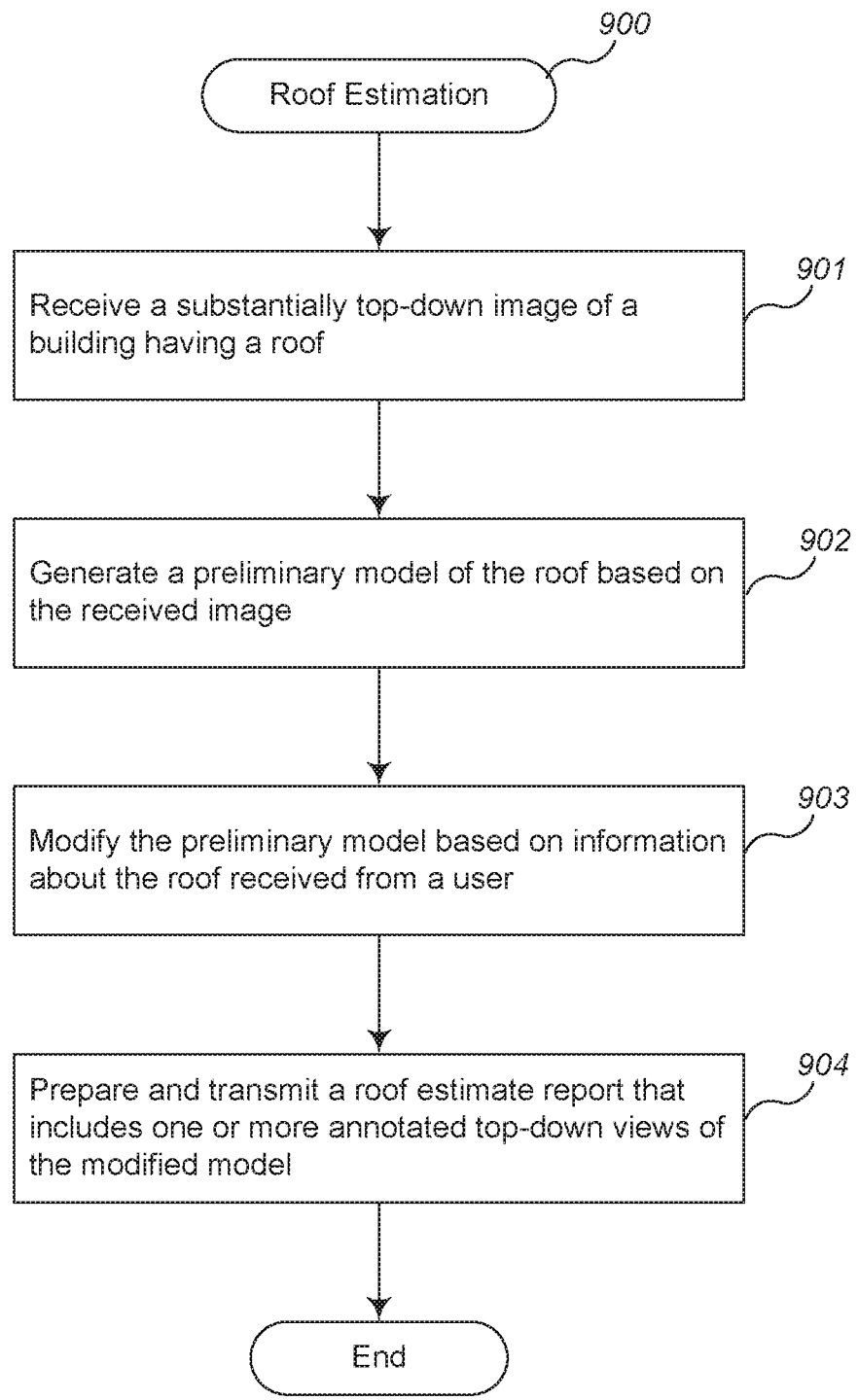
FIG. 15 is an example flow diagram of a second example roof estimation routine provided by an example embodiment.

FIG. 15 is an example flow diagram of a second example roof estimation routine provided by an example embodiment. The illustrated routine 900 may be provided by, for example, execution of the roof estimation system 710 described with respect to FIG. 13. The illustrated routine 900 generates a roof estimate report based on a single aerial image and additional information received from a user, such as information about the pitch of various roof sections.

In step 901, the routine receives a substantially top-down aerial image of a building having a roof. Such an aerial image may be obtained from, for example, a satellite or aircraft.

In step 902, the routine generates a preliminary model of the roof based on the received aerial image. The preliminary roof model may be a two-dimensional ("flat") model that includes information about the perimeter of the roof and at least some of its corresponding planar roof sections. Such a preliminary roof model may include estimates of various dimensions of the roof, such as edge lengths and/or section areas. In some cases, the preliminary roof model does not include information related to the pitch of various roof sections.

In step 903, the routine modifies the preliminary model based on additional information about the roof received from a user. For example, the preliminary model may be presented to a user (e.g., a customer, an operator, etc.), by displaying a representation of the model, such as a line drawing. In response, the user provides the routine with pitch information and/or feature identification (e.g., of ridges and/or valleys), etc. Such user-supplied information is then incorporated into the preliminary roof model to obtain a modified (refined) roof model. In some cases, the user supplies the additional information via a Web-base interface that provides access to the routine.

In step 904, the routine prepares and transmits a roof estimate report that includes one or more annotated views of the modified model. As discussed above, the annotations may include numerical values indicating the slope, area, and lengths of the edges of the perimeter of at least some of the roof sections of the roof. After step 904, the routine ends.

The routines 800 and 900 may be used in conjunction to advantageously offer customers roof estimate reports at differing price points. For example, routine 800 can be utilized as part of a "premium" service that offers a customer with a more accurate roof estimate report for minimal effort on the customer's part. Routine 900 can be utilized as part of an "economy" service that offers a customer a less accurate roof estimate report at a lower price, but that may be further refined with additional effort from the customer.

From the foregoing it will be appreciated that, although specific embodiments have been described herein for purposes of illustration, various modifications may be made without deviating from the spirit and scope of the present disclosure. For example, the methods, systems, and techniques for generating and providing roof estimate reports discussed herein are applicable to other architectures other than the illustrated architecture or a particular roof estimation system implementation. Also, the methods and systems discussed herein are applicable to differing network protocols, communication media (optical, wireless, cable, etc.) and devices (such as wireless handsets, electronic organizers, personal digital assistants, portable email machines, game machines, pagers, navigation devices such as GPS receivers, etc.). Further, the methods and systems discussed herein may be utilized by and/or applied to other contexts or purposes, such as by or for solar panel installers, roof gutter installers, awning companies, HVAC contractors, general contractors, and/or insurance companies.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

generating, with a building-structure-cost-estimation computing system, a three-dimensional model of a building based on correlating a first aerial image of the building with a second aerial image of the building by registering pairs of points on the first and second aerial images, each pair of points corresponding to a same point on the building depicted in each of the first and second aerial images, the first and second aerial images each providing a different view of the building, and using variational analysis to compute a point-to-point probability spread function to estimate which individual points on the first aerial image correspond to points on the second aerial image to generate the three-dimensional model;

receiving, at the building-structure-cost-estimation computing system and from a plurality of different geographically diverse sources, first pricing data for each of a plurality of items related to the building, the first pricing data being transmitted and received in real time as each respective item is actually purchased at a respective first time and the first pricing data including at least an item description, a first actual purchase price at which the respective item was purchased, and a first geographic area at which the respective item was purchased;

aggregating, by the building-structure-cost-estimation computing system, the first pricing data for the plurality of items related to the building, the aggregating including grouping and sorting the first pricing data using at least the item description and the first geographic area;

storing, by the building-structure-cost-estimation computing system, the aggregated pricing data in a pricing database;

receiving, at the building-structure-cost-estimation computing system and from the plurality of different geographically diverse sources, second pricing data for at least one of the plurality of items related to the building, the second pricing data being transmitted and received in real time as each respective item is actually purchased at a respective second time after the respective first time, and the second pricing data includes a second actual purchase price at which each respective item was purchased, the item description, and a second geographic area at which the respective item was purchased;

updating, in real time as the at least one of the plurality of items are purchased at the respective second time and the second pricing data is received at the building-structure-cost-estimation computing system, the aggregated pricing data in the pricing database with the second pricing data for the at least one of the plurality of items related to the building purchased;

receiving, by the building-structure-cost-estimation computing system, a request for pricing of at least one of the plurality of items related to the building from a user based on the three-dimensional model of the building to repair the building, the request including at least the item description of the at least one of the plurality of items related to the building and the geographic area in which the respective item would be purchased; and outputting, from the building-structure-cost-estimation computing system and to the user based on the updated aggregated pricing data, a cost estimate in response to the request from the user, the cost estimate including at least a list of items related to repair of the building and total estimated price.

2. The method of claim 1, wherein the receiving the first pricing data for each of the plurality of items further comprises:

receiving actual labor costs within the geographic area for each respective item, wherein a unit of labor being an item of the actual labor costs.

3. The method of claim 1, wherein the cost estimate is a repair cost estimate.

4. The method of claim 1 wherein the building-structure-cost-estimation computing system further receives fourth pricing data for each of the plurality of items, the fourth pricing data being received from a plurality of data feeds that include at least one third-party database feed, at least one material price feed, at least one user data feed, at least one specialty feed, and at least one manufacturer data feed.

5. The method of claim 4 wherein receiving the plurality of data feeds includes receiving a labor cost estimate to perform a repair.

6. The method of claim 1 wherein the geographic area further comprises geographic areas within one or more selected zip codes.

7. The method of claim 1 wherein the pricing database enables access to pricing data for the plurality of items by geographic region.

8. The method of claim 1 wherein an item represents a unit of labor.

9. The method of claim 1 wherein an item represents a unit of roofing material to be placed onto a roof to repair a roof.

10. The method of claim 1 wherein an item represents a unit of combined labor and material.

11. The method of claim 1 wherein the request includes an indication of an item and an indication of a geographic area.

12. The method of claim 1, wherein the receiving of the first pricing data and the receiving of the second pricing data are performed in an automated manner without human intervention.

13. The method of claim 1, wherein aggregating the pricing data further comprises:

selecting, by the building-structure-cost-estimation computing system, one or more pricing data feeds to which weighting factors will be applied;

determining, by the building-structure-cost-estimation computing system, the weighting factors to be applied to pricing data from the one or more pricing data feeds;

applying, by the building-structure-cost-estimation computing system, the weighting factors to the pricing data from the one more pricing data feeds to create weighted pricing data; and combining, by the building-structure-cost-estimation computing system, the weighted and un-weighted respective pricing data by geographic area.

14. The method of claim 13 wherein the geographic area comprises geographic areas within one or more selected zip codes.

15. The method of claim 13 wherein the weighting factors are determined in an automated manner by a computer program without human intervention.

16. The method of claim 13 wherein the weighting factors are determined at least by one of: indication of pricing data feed and indication of geographic area.

17. A computer system, comprising:
one or more hardware processors;
a non-transitory computer readable memory operably coupled to the one or more hardware processors;
a module stored in the non-transitory computer readable memory, when executed by at least one of the one or more hardware processors, the module configured to:
generate a three-dimensional model of a building based on correlating a first aerial image of the building with a second aerial image of the building by registering pairs of points on the first and second aerial images, each pair of points corresponding to the same point on the building depicted in each of the first and second aerial images, the first and second aerial images each providing a different view of the building, and using variational analysis to compute a point-to-point probability spread function to estimate which individual points on the first aerial image correspond to points on the second aerial image to generate the three-dimensional model;
receive first pricing data for each of a plurality of items related to the building from at least one of a plurality of geographically diverse different sources, the first pricing data being transmitted and received in real time as each respective item is actually purchased at a respective first time, and the first pricing data including at least an item description, an actual purchase price at which each respective item was purchased, and a first geographic area at which each respective item was purchased;
aggregate the first pricing data for each of the plurality of items related to the building, the aggregating including grouping and sorting the first pricing data using at least the item description and the first geographic area;
store the aggregated pricing data in a pricing database;
receive second pricing data for at least one of the plurality of items related to the building from at least one of the plurality of different geographically diverse sources, the second pricing data being transmitted and received in real time as each respective item is actually purchased at a respective second time which is after the respective first time, and the second pricing data includes a second actual purchase price at which each respective item was purchased, the item description, and a second geographic area, which may match the first geographic area, at which the respective item was purchased;
update, in real time as the at least one of the plurality of items are purchased at the second respective time and the second pricing data is received, the aggregated pricing data in the pricing database with the second pricing data for the at least one of the plurality of items related to the building purchased;
receive a request for pricing of at least one of the plurality of items related to the building from a user based on the three-dimensional model of the building to repair the building, the request including at least the item description of the at least one of the plurality of items related to the building and the geographic area in which the respective item would be purchased; and
output a cost estimate based on the updated aggregated pricing data in response to the request from the user, the cost estimate including at least a list of items related to repair of the building and total estimated price.

18. The computer system of claim 17, wherein the module configured to receive the first pricing data for each of the plurality of items further comprises the module configured to receive actual labor costs for the geographic area for each respective item.

19. The computer system of claim 17, wherein the geographic area further comprises geographic areas within one or more zip codes.

\* \* \* \* \*